US012711897B2

United States Patent
Jang et al.

(12) United States Patent
(10) Patent No.: US 12,711,897 B2
(45) Date of Patent: Aug. 18, 2026

(54) DISPLAY DEVICE, METHOD OF DRIVING THE SAME, AND ELECTRONIC APPARATUS INCLUDING THE SAME

(71) Applicant: Samsung Display Co., LTD., Yongin-si (KR)

(72) Inventors: Wonwoo Jang, Yongin-si (KR); Daye Moon, Yongin-si (KR); Jongha Shin, Yongin-si (KR); Kitae Yoon, Yongin-si (KR); Kyoungho Lim, Yongin-si (KR); Yooshin Chon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/256,502

(22) Filed: Jul. 1, 2025

(65) Prior Publication Data

US 2025/0329287 A1 Oct. 23, 2025

Related U.S. Application Data

(62) Division of application No. 18/428,722, filed on Jan. 31, 2024, now Pat. No. 12,380,829.

(30) Foreign Application Priority Data

May 15, 2023 (KR) ........................ 10-2023-0062428

(51) Int. Cl.
*G09G 3/20* (2006.01)

(52) U.S. Cl.
CPC ... *G09G 3/2092* (2013.01); *G09G 2300/0842* (2013.01); *G09G 2310/0232* (2013.01);
(Continued)

(58) Field of Classification Search
None
See application file for complete search history.

(56) References Cited

U.S. PATENT DOCUMENTS

2004/0263538 A1* 12/2004 Ohta .................... G09G 3/2022
348/E5.066
2004/0263541 A1* 12/2004 Takeuchi ............. G09G 3/2077
345/692

(Continued)

FOREIGN PATENT DOCUMENTS

KR 100521467 B1 10/2005
KR 100560489 B1 3/2006

*Primary Examiner* — Parul H Gupta
(74) *Attorney, Agent, or Firm* — CANTOR COLBURN LLP

(57) ABSTRACT

A display device includes a driving controller which generates output image data based on input image data, a data driver which generates data voltages based on the output image data, and a display panel which displays an image based on the data voltages. The driving controller may generate a plurality of edge values in a first direction for a plurality of blocks based on a plurality of luminance values for the plurality of blocks that are dividing the display panel, determine a boundary area in the first direction based on a continuity of edge blocks in a second direction crossing the first direction, the edge blocks being determined based on the plurality of edge values, and generate the output image data based on the input image data and compensation data for decreasing a luminance of the image corresponding to the boundary area.

20 Claims, 22 Drawing Sheets

(52) U.S. Cl.
CPC ............... *G09G 2320/0233* (2013.01); *G09G 2320/0257* (2013.01); *G09G 2320/0626* (2013.01); *G09G 2320/0686* (2013.01); *G09G 2330/021* (2013.01)

(56) References Cited

U.S. PATENT DOCUMENTS

2010/0060789 A1* 3/2010 Aoki ........................ G09G 5/14
725/33
2016/0307492 A1* 10/2016 Kim ..................... G09G 3/2044

* cited by examiner

FIG. 5

BL

| | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| R1 | BL1 | BL19 | BL37 | BL55 | BL73 | BL91 | BL109 | BL127 | BL145 | BL163 | BL181 | BL199 | BL217 | BL235 | BL253 | BL271 |
| R2 | BL2 | BL20 | BL38 | BL56 | BL74 | BL92 | BL110 | BL128 | BL146 | BL164 | BL182 | BL200 | BL218 | BL236 | BL254 | BL272 |
| R3 | BL3 | BL21 | BL39 | BL57 | BL75 | BL93 | BL111 | BL129 | BL147 | BL165 | BL183 | BL201 | BL219 | BL237 | BL255 | BL273 |
| R4 | BL4 | BL22 | BL40 | BL58 | BL76 | BL94 | BL112 | BL130 | BL148 | BL166 | BL184 | BL202 | BL220 | BL238 | BL256 | BL274 |
| R5 | BL5 | BL23 | BL41 | BL59 | BL77 | BL95 | BL113 | BL131 | BL149 | BL167 | BL185 | BL203 | BL221 | BL239 | BL257 | BL275 |
| R6 | BL6 | BL24 | BL42 | BL60 | BL78 | BL96 | BL114 | BL132 | BL150 | BL168 | BL186 | BL204 | BL222 | BL240 | BL258 | BL276 |
| R7 | BL7 | BL25 | BL43 | BL61 | BL79 | BL97 | BL115 | BL133 | BL151 | BL169 | BL187 | BL205 | BL223 | BL241 | BL259 | BL277 |
| R8 | BL8 | BL26 | BL44 | BL62 | BL80 | BL98 | BL116 | BL134 | BL152 | BL170 | BL188 | BL206 | BL224 | BL242 | BL260 | BL278 |
| R9 | BL9 | BL27 | BL45 | BL63 | BL81 | BL99 | BL117 | BL135 | BL153 | BL171 | BL189 | BL207 | BL225 | BL243 | BL261 | BL279 |
| R10 | BL10 | BL28 | BL46 | BL64 | BL82 | BL100 | BL118 | BL136 | BL154 | BL172 | BL190 | BL208 | BL226 | BL244 | BL262 | BL280 |
| R11 | BL11 | BL29 | BL47 | BL65 | BL83 | BL101 | BL119 | BL137 | BL155 | BL173 | BL191 | BL209 | BL227 | BL245 | BL263 | BL281 |
| R12 | BL12 | BL30 | BL48 | BL66 | BL84 | BL102 | BL120 | BL138 | BL156 | BL174 | BL192 | BL210 | BL228 | BL246 | BL264 | BL282 |
| R13 | BL13 | BL31 | BL49 | BL67 | BL85 | BL103 | BL121 | BL139 | BL157 | BL175 | BL193 | BL211 | BL229 | BL247 | BL265 | BL283 |
| R14 | BL14 | BL32 | BL50 | BL68 | BL86 | BL104 | BL122 | BL140 | BL158 | BL176 | BL194 | BL212 | BL230 | BL248 | BL266 | BL284 |
| R15 | BL15 | BL33 | BL51 | BL69 | BL87 | BL105 | BL123 | BL141 | BL159 | BL177 | BL195 | BL213 | BL231 | BL249 | BL267 | BL285 |
| R16 | BL16 | BL34 | BL52 | BL70 | BL88 | BL106 | BL124 | BL142 | BL160 | BL178 | BL196 | BL214 | BL232 | BL250 | BL268 | BL286 |
| R17 | BL17 | BL35 | BL53 | BL71 | BL89 | BL107 | BL125 | BL143 | BL161 | BL179 | BL197 | BL215 | BL233 | BL251 | BL269 | BL287 |
| R18 | BL18 | BL36 | BL54 | BL72 | BL90 | BL108 | BL126 | BL144 | BL162 | BL180 | BL198 | BL216 | BL234 | BL252 | BL270 | BL288 |

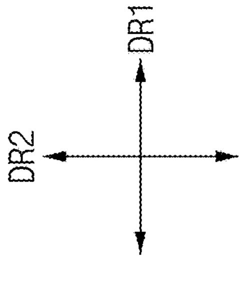

DISPLAY DEVICE, METHOD OF DRIVING THE SAME, AND ELECTRONIC APPARATUS INCLUDING THE SAME

This application is a divisional of U.S. patent application Ser. No. 18/428,722, filed on Jan. 31, 2024, which claims priority to Korean Patent Application No. 10-2023-0062428, filed on May 15, 2023, and all the benefits accruing therefrom under 35 U.S.C. § 119, the content of which in its entirety is herein incorporated by reference.

BACKGROUND

1. Field

Embodiments of the invention relate to a display device, and more particularly, to a display device which delays an afterimage from appearing on the display device, a method of driving the display device, and an electronic apparatus including the display device.

2. Description of the Related Art

With the development of information technologies, the importance of a display device that is a connection medium between a user and information has increased. Accordingly, display devices such as a liquid crystal display device, an organic light emitting display device, or the like are increasingly used. The organic light emitting display device displays an image using an organic light emitting diode that generates light by recombination of electrons and holes. The organic light emitting display device has a relatively high response speed, and is driven with relatively low power consumption.

When the organic light emitting display device displays the same image for a long period of time, an afterimage (or stain) may be visible in an image being displayed by the organic light emitting display device due to burn-in of the organic light emitting diode included in the organic light emitting display device. Specifically, when the organic light emitting display device displays a split image including different images with a boundary extending in a vertical direction in between, an afterimage (or stain) in the form of a line extending in the vertical direction may be visible.

SUMMARY

Embodiments provide a display device which may delay an occurrence of an afterimage (or stain).

Embodiments provide a method of driving a display device which may delay an occurrence of an afterimage (or stain).

Embodiments provide an electronic apparatus including a display device which may delay an occurrence of an afterimage (or stain).

A display device according to an embodiment may include a driving controller which generates output image data based on input image data, a data driver which generates data voltages based on the output image data, and a display panel which displays an image based on the data voltages. The driving controller may generate a plurality of edge values in a first direction for a plurality of blocks dividing the display panel based on a plurality of luminance values for the plurality of blocks, determine a boundary area in the first direction based on a continuity of edge blocks in a second direction crossing the first direction, wherein the edge blocks are determined based on the plurality of edge values among the plurality of blocks, and generate the output image data based on the input image data and compensation data for decreasing a luminance of the image corresponding to the boundary area.

In an embodiment, each of the plurality of blocks may include a plurality of pixels.

In an embodiment, a luminance value for a block among the plurality of blocks may be an average of a plurality of luminance values corresponding to a plurality of grayscale values of the input image data for a plurality of pixels included in the block.

In an embodiment, the driving controller may include a luminance generator which generates the plurality of luminance values based on the input image data, an edge generator which generates the plurality of edge values based on the plurality of luminance values, a determiner which determines the boundary area based on the plurality of edge values, a compensation data generator which generates the compensation data based on the boundary area, and a data compensator which generates the output image data based on the input image data and the compensation data.

In an embodiment, the edge generator may generate the plurality of edge values by filtering the plurality of luminance values in the first direction using a high pass filter.

In an embodiment, the determiner may include a count generator which generates a plurality of count values for the plurality of blocks based on the plurality of edge values, and a boundary determiner which determines the edge blocks having a maximum count value among the plurality of blocks, and determines edge block columns based on the continuity of the edge blocks in the second direction as the boundary area.

In an embodiment, the count generator may increase a count value for a block among the plurality of blocks when an edge value for the block is greater than a threshold value.

In an embodiment, the count generator may maintain the count value for the block when the count value for the block is equal to the maximum count value.

In an embodiment, the count generator may decrease the count value for the block when the edge value for the block is less than or equal to the threshold value.

In an embodiment, the count generator may maintain the count value for the block when the count value for the block is equal to a minimum count value.

In an embodiment, the driving controller may further include a memory which stores the plurality of count values.

In an embodiment, the boundary determiner may calculate a number of the edge blocks included in each of a plurality of block columns extending in the second direction, and may determine block columns in which the number of the edge blocks is greater than a threshold number among the plurality of block columns as the edge block columns.

In an embodiment, the threshold number may be a half of a number of the blocks included in each of the plurality of block columns.

In an embodiment, the luminance generator may generate the plurality of luminance values for each frame period. The edge generator may generate the plurality of edge values for the frame period. The count generator may generate the plurality of count values for the frame period.

In an embodiment, the boundary determiner may determine the edge blocks and the edge block columns for a plurality of frame periods.

In an embodiment, the compensation data may include first compensation data. The compensation data generator may generate the first compensation data for gradually decreasing the luminance values for pixels included in the boundary area and a peripheral area located adjacent to the boundary area in the first direction along the first direction toward a boundary line extending in the second direction in the boundary area.

In an embodiment, the compensation data may further include second compensation data. The compensation data generator may generate the second compensation data for uniformly decreasing the luminance values for the pixels included in the display panel.

In an embodiment, a method of driving a display device including a display panel which displays an image may include generating a plurality of luminance values for a plurality of blocks dividing the display panel based on input image data, generating a plurality of edge values in a first direction for the plurality of blocks based on the plurality of luminance values, determining a boundary area in the first direction based on a continuity of edge blocks in a second direction crossing the first direction, where the edge blocks may be determined based on the plurality of edge values among the plurality of blocks, generating compensation data for decreasing a luminance of an image corresponding to the boundary area, and generating output image data based on the input image data and the compensation data.

In an embodiment, determining the boundary area may include generating a plurality of count values for the plurality of blocks based on the plurality of edge values, determining the edge blocks having a maximum count value among the plurality of blocks, and determining edge block columns determined based on the continuity of the edge blocks in the second direction as the boundary area.

In an embodiment, determining the edge block columns as the boundary area may include calculating a number of the edge blocks included in each of a plurality of block columns extending in the second direction, and determining block columns in which the number of the edge blocks is greater than a threshold number among the plurality of block columns as the edge block columns.

In an embodiment, the threshold number may be a half of a number of the blocks included in each of the plurality of block columns.

In an embodiment, the compensation data may include first compensation data. Generating the compensation data may include generating the first compensation data for gradually decreasing the luminance values for pixels included in the boundary area and a peripheral area located adjacent to the boundary area in the first direction along the first direction toward a boundary line extending in the second direction in the boundary area.

In an embodiment, the compensation data may further include second compensation data. Generating the compensation data may further include generating the second compensation data for uniformly decreasing the luminance values for the pixels included in the display panel.

An electronic apparatus according to embodiments may include a main processor which generates an image signal, a coprocessor which generates output image data by converting input image data corresponding to the image signal, and a display panel which displays an image based on the output image data. The coprocessor may generate a plurality of edge values in a first direction for a plurality of blocks based on a plurality of luminance values for the plurality of blocks dividing the display panel, determine a boundary area in the first direction based on a continuity of edge blocks in a second direction crossing the first direction, where the edge blocks may be determined based on the plurality of edge values among the plurality of blocks, and generate the output image data based on the input image data and compensation data for decreasing a luminance of the image corresponding to the boundary area.

In an embodiment, the coprocessor may include a luminance generator which generates the plurality of luminance values based on the input image data, an edge generator which generates the plurality of edge values based on the plurality of luminance values, a determiner which determines the boundary area based on the plurality of edge values, a compensation data generator which generates the compensation data based on the boundary area, and a data compensator which generates the output image data based on the input image data and the compensation data.

A display device according to embodiments may include a driving controller which generates output image data based on input image data, a data driver which generates data voltages based on the output image data, and a display panel which displays an image based on the data voltages. When the display panel displays a first image and a second image with a boundary line extending in a second direction crossing a first direction in between and grayscale values of the input image data corresponding to the first image are equal, a measured luminance of a first portion of the first image located adjacent to the boundary line may be lower than a measured luminance of a second portion of the first image located farther than the first portion in the first direction from the boundary line.

In an embodiment, the first direction may be parallel to a long side of the display panel. The second direction may be parallel to a short side of the display panel.

According to embodiments, in the display device, the method of driving the display device, and the electronic apparatus including the display device, the boundary area of the image may be determined based on the input image data, the compensation data for decreasing the luminance of the image corresponding to the boundary area may be generated, and the input image data may be compensated based on the compensation data, so that the luminance of the boundary area of the image may decrease. Accordingly, the occurrence of the afterimage (or stain) in the boundary area of the image may be delayed, and a lifetime of the display device may increase.

BRIEF DESCRIPTION OF THE DRAWINGS

Illustrative, non-limiting embodiments will be more clearly understood from the following detailed description taken in conjunction with the accompanying drawings.

FIG. 5 is a block diagram illustrating blocks dividing a display panel included in the display device in FIG. 1, according to an embodiment.

DETAILED DESCRIPTION

Figure 1:
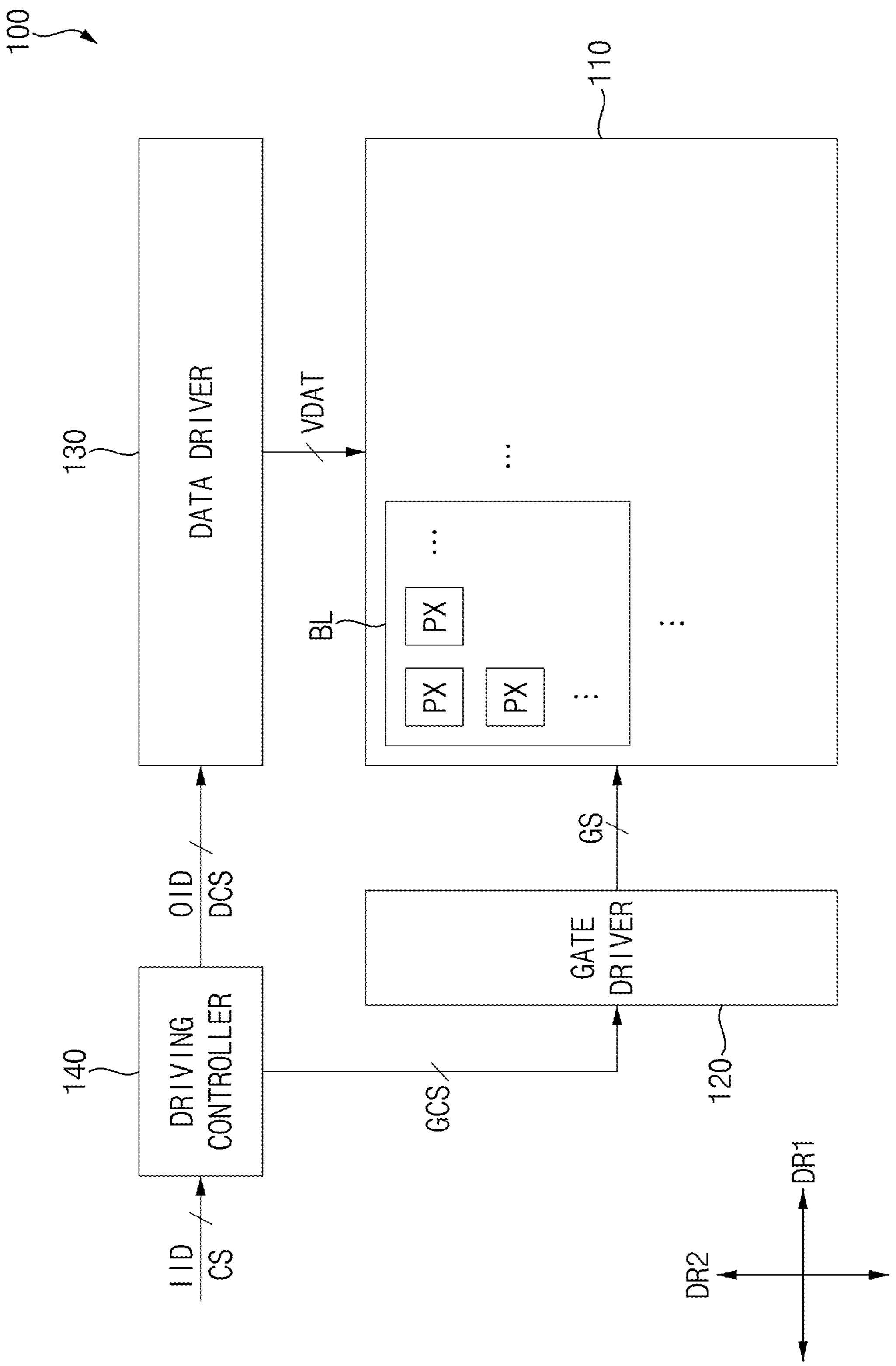
FIG. 1 is a block diagram illustrating a display device, according to an embodiment.

Hereinafter, a display device, a method of driving a display device, and an electronic apparatus according to embodiments will be described in more detail with reference to the accompanying drawings. The same or similar reference numerals will be used for the same elements in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or a region, a layer, a portion, or the like) is referred to as being related to another such as being "on", "connected to" or "coupled to" another element, it may be directly disposed on, connected or coupled to the other element, or intervening elements may be disposed therebetween.

Like reference numerals or symbols refer to like elements throughout. In the drawings, the thickness, the ratio, and the size of the element are exaggerated for effective description of the technical contents. As used herein, the term "and/or" includes any and all combinations of one or more of the associated listed items.

The term "and/or," includes all combinations of one or more of which associated configurations may define.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the scope of the inventive concept. Similarly, a second element, component, region, layer or section may be termed a first element, component, region, layer or section. As used herein, the singular forms, "a", "an" and "the" are intended to include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be further understood that the terms "comprise", "includes" and/or "have", when used in this specification, specify the presence of stated features, integers, steps, operations, elements, components, and/or groups thereof, but do not preclude the presence or addition of one or more other features, integers, steps, operations, elements, components, and/or groups thereof. As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a display device 100, according to an embodiment.

In an embodiment and referring to FIG. 1, a display device 100 may include a display panel 110, a gate driver 120, a data driver 130, and a driving controller 140.

In an embodiment, the display panel 110 may include pixels PX. The pixels PX may display an image based on gate signals GS and data voltages VDAT.

In an embodiment, the display panel 110 may be divided into a plurality of blocks BL. The blocks BL may be arranged in a first direction DR1 and a second direction DR2 crossing the first direction DR1. Each of the blocks BL may include a plurality of pixels PX.

In an embodiment, the gate driver 120 may provide the gate signals GS to the display panel 110. The gate driver 120 may generate the gate signals GS based on a gate control signal GCS. The gate control signal GCS may include a gate start signal, a gate clock signal, etc.

In an embodiment, the data driver 130 may provide the data voltages VDAT to the display panel 110. The data driver 130 may generate the data voltages VDAT based on output image data OID and a data control signal DCS. The output image data OID may include grayscale values for the pixels PX. The data control signal DCS may include a data clock signal, a horizontal start signal, a load signal, etc.

In an embodiment, the driving controller 140 may control a driving (or operation) of the gate driver 120 and a driving (or operation) of the data driver 130. The driving controller 140 may generate the output image data OID, the gate control signal GCS, and the data control signal DCS based on input image data IID and a control signal CS. The input image data IID may include grayscale values for the pixels PX. The control signal CS may include a vertical synchronization signal, a horizontal synchronization signal, a master clock signal, a data enable signal, etc.

Figure 2:
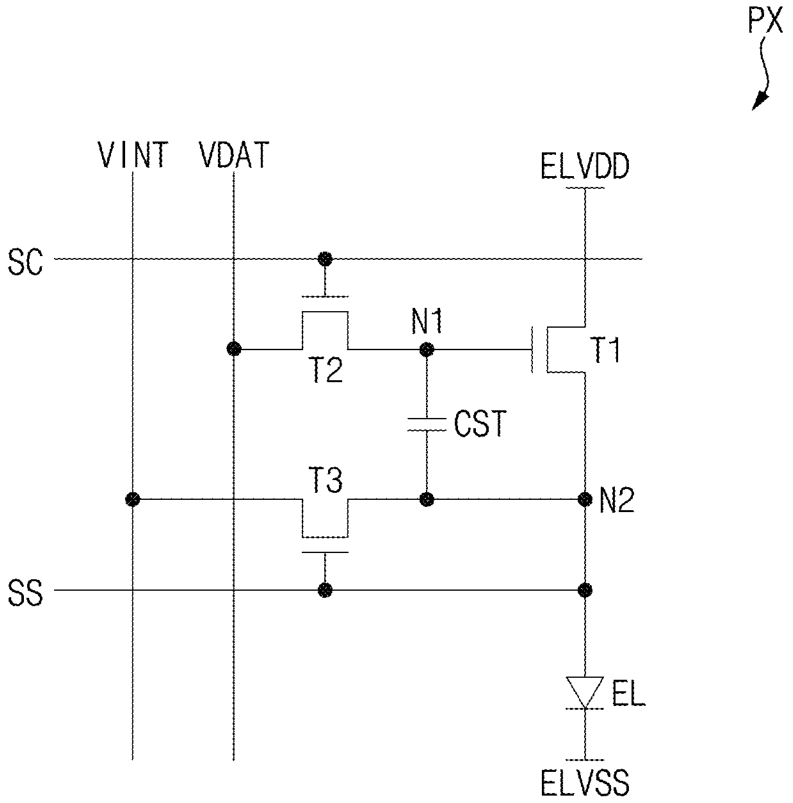
FIG. 2 is a schematic circuit diagram illustrating a pixel included in the display device in FIG. 1, according to an embodiment.

FIG. 2 is a schematic circuit diagram illustrating the pixel PX included in the display device 100 in FIG. 1, according to an embodiment.

In an embodiment and referring to FIGS. 1 and 2, the pixel PX may receive a scan signal SC, a sensing signal SS, the data voltage VDAT, an initialization voltage VINT, a first power voltage ELVDD, and a second power voltage ELVSS. The gate signal GS may include the scan signal SC and the sensing signal SS. A voltage level of the first power voltage ELVDD may be higher than a voltage level of the second power voltage ELVSS. The pixel PX may include a first transistor T1, a second transistor T2, a third transistor T3, a storage capacitor CST, and a light emitting diode EL.

In an embodiment, the first transistor T1 may include a gate electrode connected to a first node N1, a first electrode receiving the first power voltage ELVDD, and a second electrode connected to a second node N2. The first transistor T1 may generate a driving current based on a voltage between the first node N1 and the second node N2. The first transistor T1 may be referred as a driving transistor.

In an embodiment, the second transistor T2 may include a gate electrode receiving the scan signal SC, a first electrode receiving the data voltage VDAT, and a second electrode connected to the first node N1. The second transistor T2 may provide the data voltage VDAT to the first node N1 in response to the scan signal SC. The second transistor T2 may be referred as a switching transistor or a write transistor.

In an embodiment, the third transistor T3 may include a gate electrode receiving the sensing signal SS, a first electrode receiving the initialization voltage VINT, and a second electrode connected to the second node N2. The third transistor T3 may provide the initialization voltage VINT to the second node N2 in response to the sensing signal SS. The third transistor T3 may be referred as an initialization transistor or a sensing transistor.

FIG. 2 illustrates an embodiment in which each of the first transistor T1, the second transistor T2, and the third transistor T3 is an N-type transistor (e.g., NMOS transistor), but the invention is not limited thereto. In another embodiment, at least one of the first transistor T1, the second transistor T2, and the third transistor T3 may be a P-type transistor (e.g., PMOS transistor).

In an embodiment, the storage capacitor CST may include a first electrode connected to the first node N1 and a second electrode connected to the second node N2. The storage capacitor CST may store the voltage between the first node N1 and the second node N2.

FIG. 2 illustrates an embodiment in which the pixel PX includes three transistors and one capacitor, but the invention is not limited thereto. In another embodiment, the pixel PX may include 2, 4 or more transistors and/or 2 or more capacitors.

In an embodiment, the light emitting diode EL may include a first electrode (or anode) connected to the second node N2 and a second electrode (or cathode) receiving the second power voltage ELVSS. The light emitting diode EL may emit light based on the driving current provided from the first transistor T1.

In an embodiment, the light emitting diode EL may be an organic light emitting diode. In another embodiment, the light emitting diode EL may be an inorganic light emitting diode or a quantum dot light emitting diode.

Figure 3:
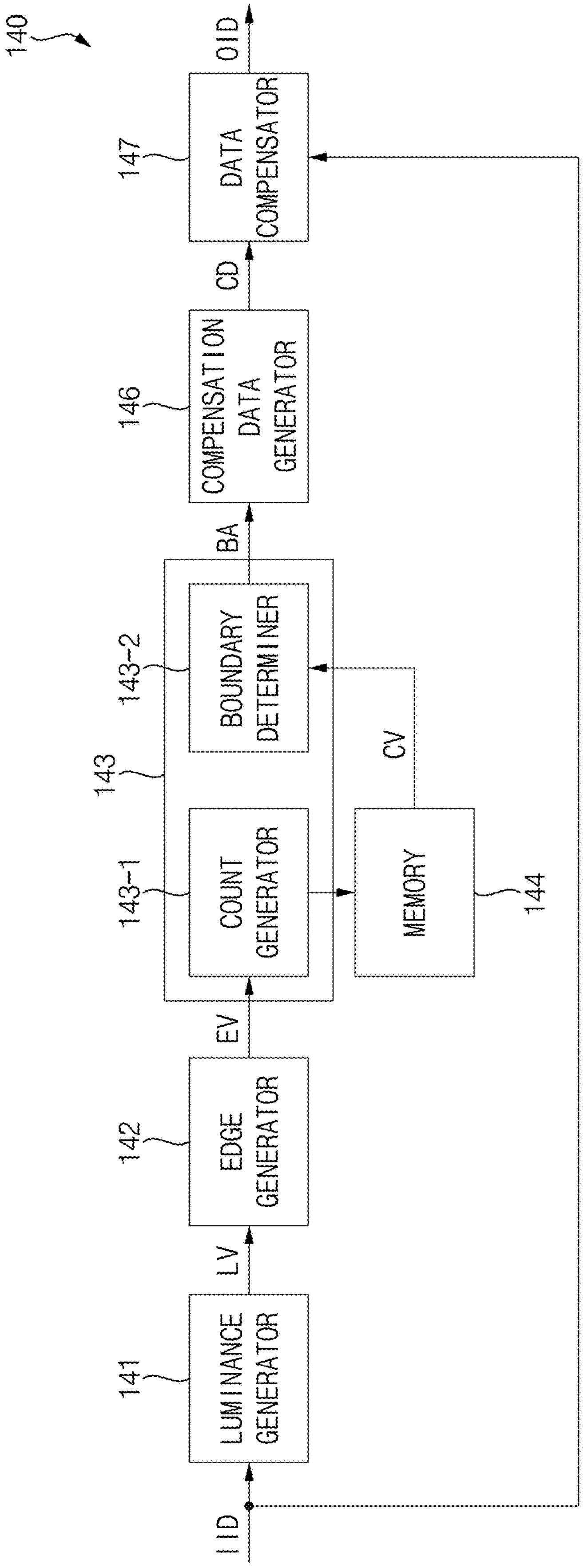
FIG. 3 is a block diagram illustrating a driving controller included in the display device in FIG. 1, according to an embodiment.

FIG. 3 is a block diagram illustrating the driving controller 140 included in the display device 100 in FIG. 1, according to an embodiment.

In an embodiment and referring to FIGS. 1 and 3, the driving controller 140 may generate edge values EV in the first direction DR1 for the blocks BL based on luminance values LV for the blocks BL, may determine a boundary area BA in the first direction DR1 based on a continuity of edge blocks in the second direction DR2 determined based on the edge values EV among the blocks BL, and may generate the output image data OID based on the input image data IID and compensation data CD for decreasing a luminance of an image corresponding to the boundary area BA. The driving controller 140 may include a luminance generator 141, an edge generator 142, a determiner 143, a memory 144, a compensation data generator 146, and a data compensator 147.

In an embodiment, the luminance generator 141 may generate the luminance values LV for the blocks BL based on the input image data IID. The luminance generator 141 may generate the luminance values LV for each frame period.

In an embodiment, a luminance value LV for a block BL may be an average of luminance values corresponding to grayscale values of the input image data IID for pixels PX included in the block BL. In an embodiment, the luminance generator 141 may convert the grayscale values for the pixels PX included in the block BL into the luminance values for the pixels PX using a gamma curve (for example, a gamma curve with a gamma value of 2.2), and may calculate the average of the luminance values for the pixels PX as the luminance value LV for the block BL.

In an embodiment, the edge generator 142 may generate the edge values EV in the first direction DR1 for the blocks BL based on the luminance values LV for the blocks BL.

When a difference between luminance values LV for blocks BL located adjacent in the first direction DR1 is large, edge values EV for the blocks BL located adjacent in the first direction DR1 may be large. When the difference between the luminance values LV for the blocks BL located adjacent in the first direction DR1 is small, the edge values EV for the blocks BL located adjacent in the first direction DR1 may be small. The edge generator 142 may generate the edge values EV for each frame period.

In an embodiment, the edge generator 142 may generate the edge values EV for the blocks BL by filtering the luminance values LV for the blocks BL in the first direction DR1 using a high pass filter. In an embodiment, the high pass filter may be [−1, 2, −1].

In an embodiment, the determiner 143 may determine the boundary area BA in the first direction DR1 based on the continuity of the edge blocks in the second direction DR2, which is determined based on the edge values EV for the blocks BL. The boundary area BA may extend in the second direction DR2. In an embodiment, the determiner 143 may include a count generator 143-1 and a boundary determiner 143-2.

In an embodiment, the count generator 143-1 may generate count values CV for the blocks BL based on the edge values EV for the blocks BL. The count generator 143-1 may generate the count values CV for each frame period.

In an embodiment, the count generator 143-1 may increase the count value CV for the block BL when the edge value EV for the block BL is greater than a threshold value. The threshold value may be a value that serves as a reference for determining the size of the edge value EV for the block BL. In an embodiment, the count generator 143-1 may add 1 to the count value CV for the block BL when the edge value EV for the block BL is greater than the threshold value.

In an embodiment, the count generator 143-1 may maintain the count value CV for the block BL when the count value CV for the block BL is equal to a maximum count value. Accordingly, an upper limit of the count value CV for the block BL may be the maximum count value, and the count value CV for the block BL may be prevented from excessively increasing.

In an embodiment, the count generator 143-1 may decrease the count value CV for the block BL when the edge value EV for the block BL is less than or equal to the threshold value. In an embodiment, the count generator 143-1 may add −1 to the count value CV for the block BL when the edge value EV for the block BL is less than or equal to the threshold value.

In an embodiment, the count generator 143-1 may maintain the count value CV for the block BL when the count value CV for the block BL is equal to a minimum count value. Accordingly, a lower limit of the count value CV for the block BL may be the minimum count value, and the count value CV for the block BL may be prevented from excessively decreasing.

In an embodiment, the memory 144 may store the count values CV for the blocks BL. The memory 144 may store the count values CV for each frame period. The memory 144 may not store the luminance values LV and the edge values EV for the blocks BL.

In an embodiment, the boundary determiner 143-2 may determine the edge blocks and edge block columns based on the count values CV for the blocks BL. The boundary determiner 143-2 may periodically determine the edge blocks and the edge block columns for a plurality of frame periods.

In an embodiment, the boundary determiner 143-2 may determine which of the edge blocks have the maximum count value among the blocks BL. Accordingly, the blocks BL in which the edge value EV is greater than the threshold value over a plurality of frame periods may be determined as the edge blocks. The boundary determiner 143-2 may determine the edge block columns based on the continuity of the edge blocks in the second direction DR2 as the boundary area BA. The boundary determiner 143-2 may calculate the number of edge blocks included in each of block columns extending in the second direction DR2, and may also determine the block columns in which the number of edge blocks is greater than the threshold number among the block columns as the edge block columns in order to determine the continuity of the edge blocks in the second direction DR2. The threshold number may be a reference for determining the continuity of the edge blocks in the second direction DR2.

In an embodiment, the threshold number may be a half of the number of blocks BL included in each of the block columns. In this case, when the number of edge blocks included in the block column is greater than a half of the number of blocks BL included in the block column, the block column may be determined as the edge block column included in the boundary area BA.

In an embodiment, the compensation data generator 146 may generate compensation data CD for decreasing the luminance of the image based on the boundary area BA.

In an embodiment, the data compensator 147 may generate the output image data OID based on the input image data IID and the compensation data CD.

Hereinafter, determination of the boundary area BA based on the input image data IID will be described with reference to FIGS. 4 to 6, according to an embodiment.

Figure 4:
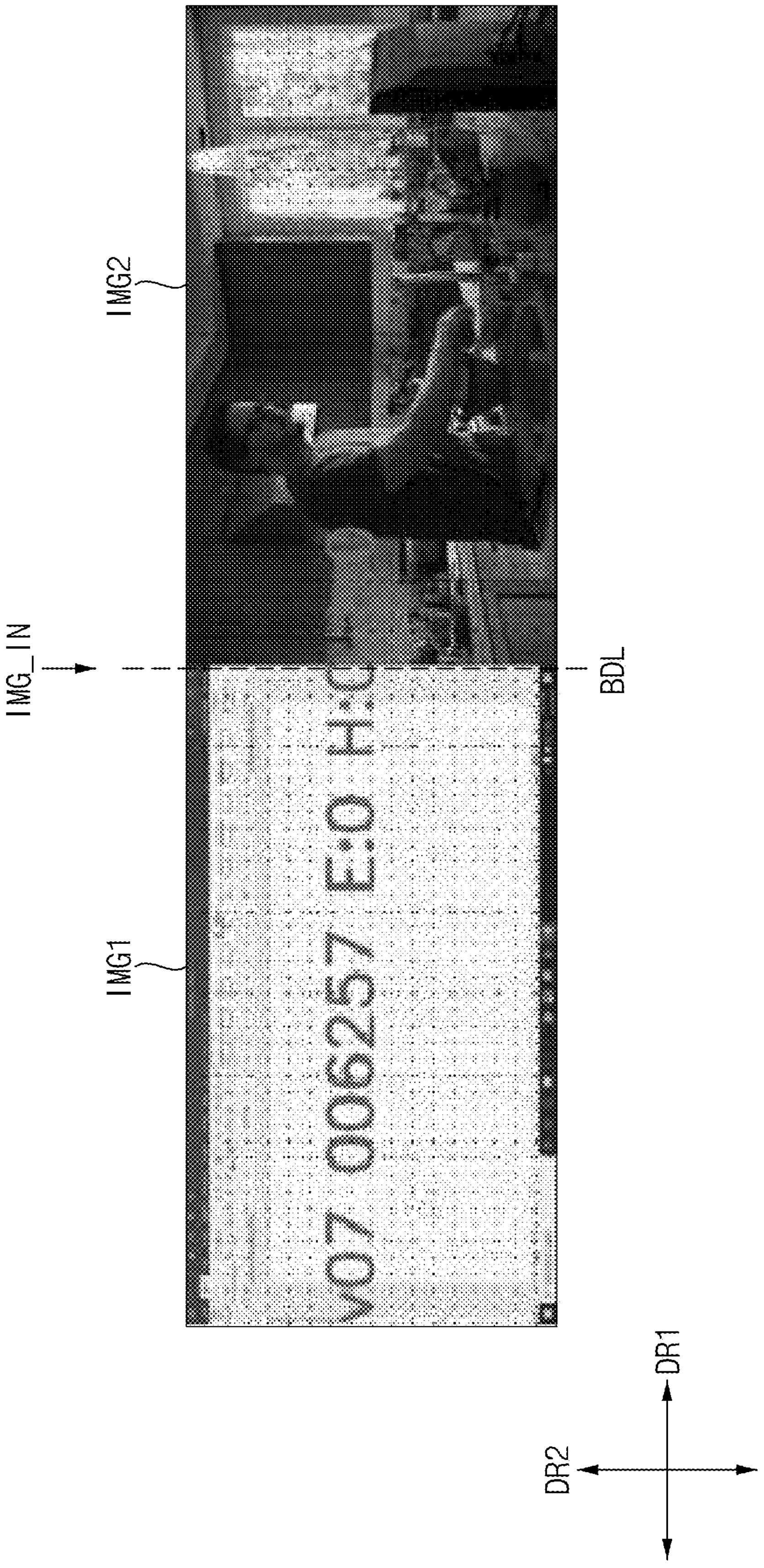
FIG. 4 is a graphic diagram illustrating an example of an input image corresponding to input image data provided to the driving controller in FIG. 3, according to an embodiment.

FIG. 4 is a diagram illustrating an example of an input image IMG_IN corresponding to the input image data IID provided to the driving controller 140 in FIG. 3, according to an embodiment.

In an embodiment and referring to FIGS. 3 and 4, the input image IMG_IN corresponding to the input image data IID provided to the driving controller 140 may include a first image IMG1 and a second image IMG2 with a boundary line BDL extending in the second direction DR2 in between. In other words, the second image IMG2 may be disposed adjacent to the first image IMG1 in the first direction DR1 with the boundary line BDL in between. For example, as illustrated in FIG. 4, the first image IMG1 may be an image that displays an application that is run by a user, and the second image IMG2 may be an image that displays a video that is viewed by the user.

FIG. 5 is a block diagram illustrating the blocks BL dividing the display panel 110 included in the display device 100 in FIG. 1 according to an embodiment.

In an embodiment and referring to FIGS. 1, 3, and 5, the luminance generator 141 may divide the display panel 110 into the blocks BL, and may generate the luminance values LV for the blocks BL. In an embodiment, the display panel 110 may be divided into 288 blocks BL1-BL288, and the blocks BL1-BL288 may be arranged as a matrix form with 18 block rows R1-R18 and 16 block columns C1-C16. However, the number of the blocks BL that divide the display panel 110 and the arrangement of the blocks BL are not limited thereto.

In an embodiment and as illustrated in FIG. 4, when a difference between a luminance of the first image IMG1 and a luminance of the second image IMG2 is large in the vicinity of the boundary line BDL, differences between the luminance values LV for the blocks BL127-BL144 included in an eighth block column C8 disposed adjacent to the boundary line BDL and from which the first image IMG1 is displayed and the luminance values LV for the blocks BL145-BL162 included in a ninth block column C9 disposed adjacent to the boundary line BDL and from which the second image IMG2 is displayed may be large. Accordingly, most edge values of the edge values EV for the blocks BL127-BL144 included in the eighth block column C8 and most edge values of the edge values EV for the blocks BL145-BL162 included in the ninth block column C9 may be greater than the threshold value.

Figure 6:
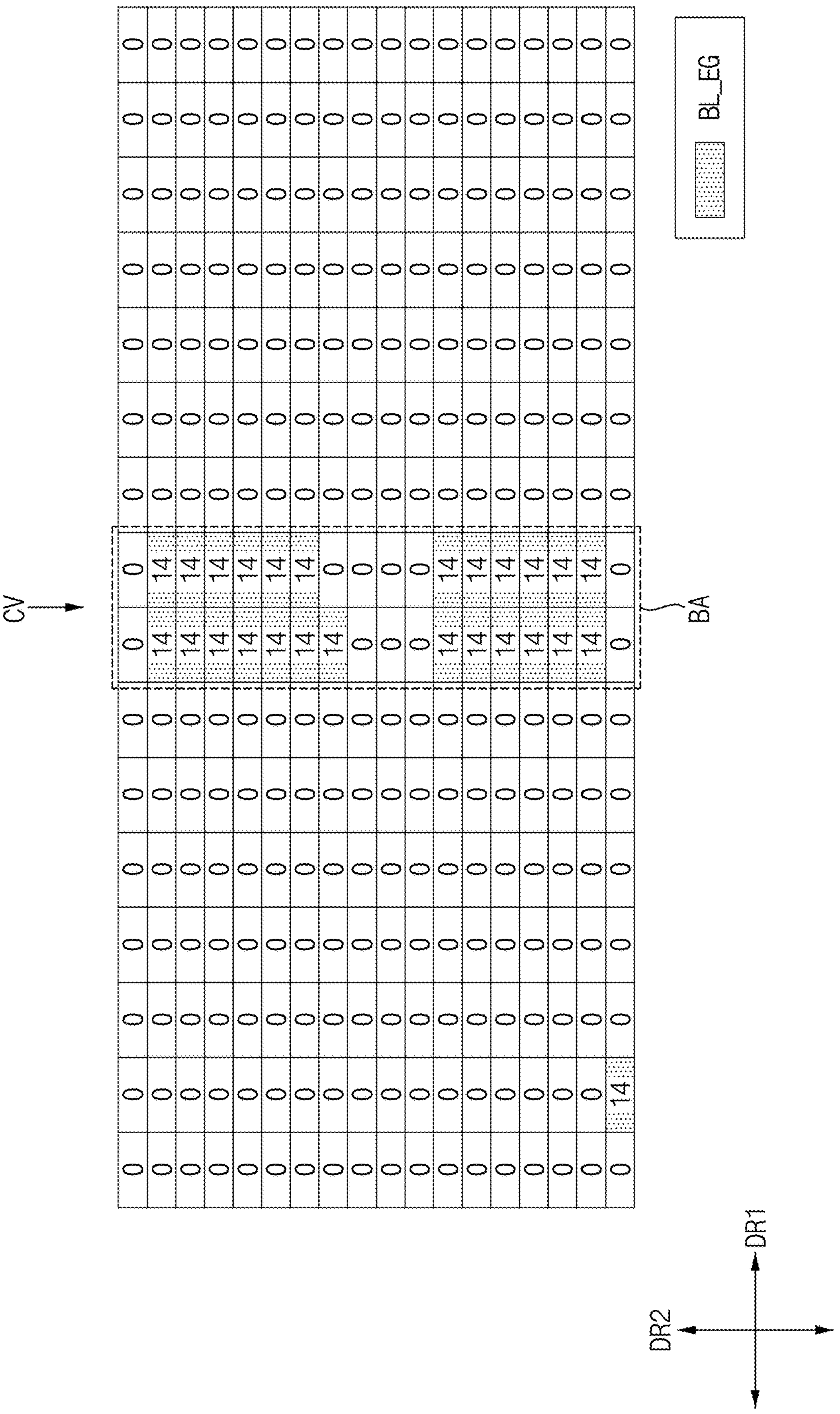
FIG. 6 is a block diagram illustrating an example of count values stored in a memory included in the driving controller in FIG. 3, according to an embodiment.

FIG. 6 is a diagram illustrating an example of the count values CV stored in the memory 144 included in the driving controller 140 in FIG. 3, according to an embodiment.

In an embodiment and referring to FIGS. 3 and 6, the boundary determiner 143-2 may determine the boundary area BA extending in the second direction DR2 based on the count values CV that are periodically stored in the memory 144 for a plurality of frame periods.

In an embodiment, when the input image data IID corresponding to the input image IMG_IN illustrated in FIG. 4 is provided to the driving controller 140 for a plurality of frame periods, most edge values of the edge values EV for the blocks BL127-BL144 included in the eighth block column C8 and most edge values of the edge values EV for the blocks BL145-BL162 included in the ninth block column C9 may be greater than the threshold value, and the count generator 143-1 may increase most count values of the count values CV for the blocks BL127-BL144 included in the eighth block column C8 and most count values of the count values CV for the blocks BL145-BL162 included in the ninth block column C9 for a plurality of frame periods.

For example, in an embodiment and as illustrated in FIG. 6, when the count values CV are stored in the memory 144, the boundary determiner 143-2 may determine blocks having the maximum count value among the blocks BL as the edge blocks BL_EG. For example, the maximum count value may be 14, and the boundary determiner 143-2 may determine a 36th block BL36, 128th to 134th blocks BL128-BL134, 138th to 143rd blocks BL138-BL143, 146th to 151st blocks BL146-BL151, and 156th to 161st blocks BL156-BL161, which have the count value CV of 14, as the edge blocks BL_EG.

In an embodiment, the boundary determiner 143-2 may determine the edge block columns based on the continuity of the edge blocks BL_EG in the second direction DR2. In an embodiment, the boundary determiner 143-2 may determine block columns in which the number of edge blocks BL_EG is greater than a threshold number among the block columns C1-C16 to be the edge block columns. For example, the threshold number may be 9, which is a half of the number of blocks included in each of the block columns C1-C16, and the boundary determiner 143-2 may determine the eighth and ninth block columns C8 and C9 in which the number of edge blocks BL_EG is greater than 9 to be the edge block columns. The boundary determiner 143-2 may determine the edge block columns C8 and C9 to be the boundary area BA.

Hereinafter, the generation of the compensation data CD based on the boundary area BA will be described with reference to FIGS. 7 to 9, according to an embodiment.

Figure 7:
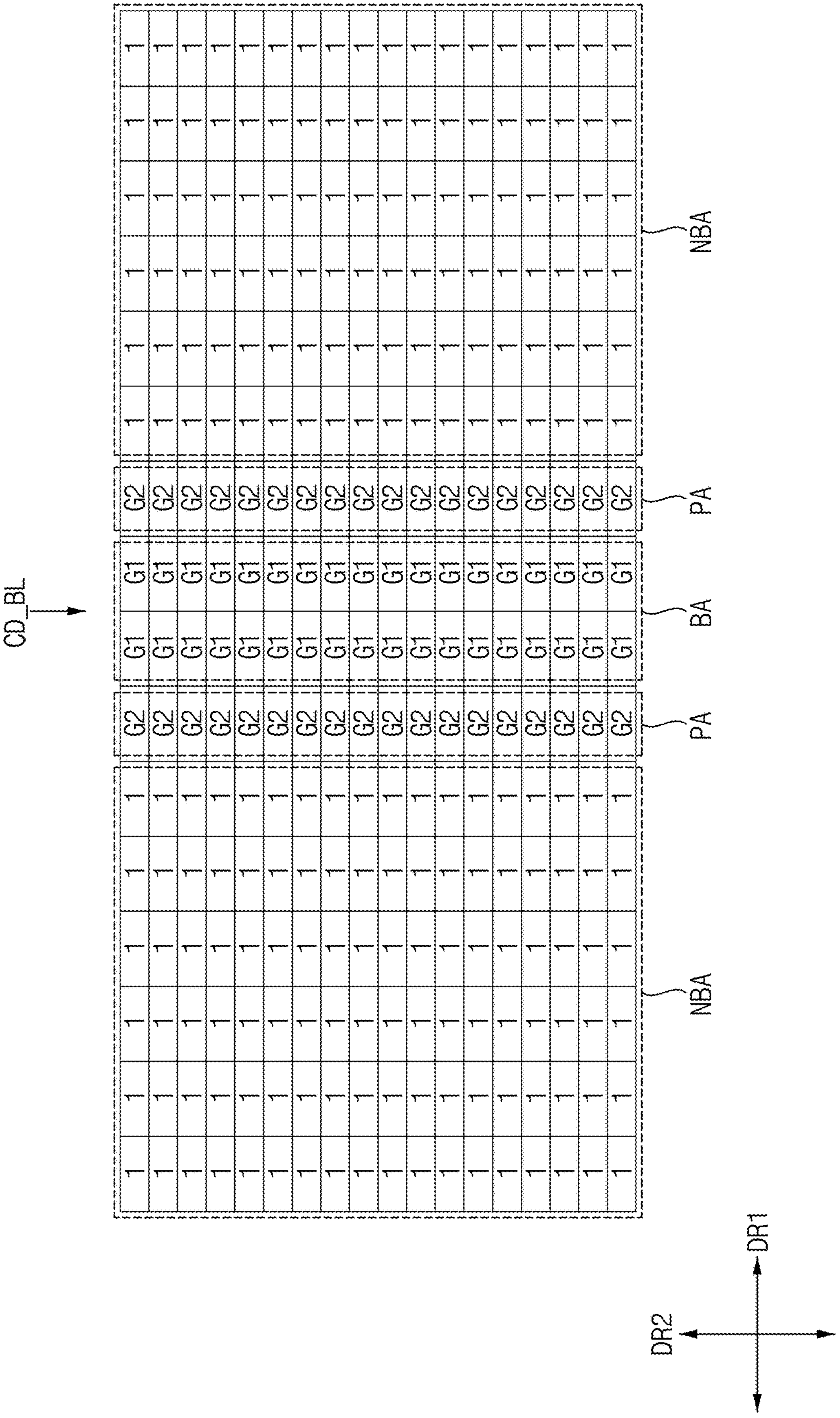
FIG. 7 is a block diagram illustrating an example of block compensation data for blocks generated based on a boundary area illustrated in FIG. 6, according to an embodiment.

FIG. 7 is a block diagram illustrating an example of block compensation data CD_BL for the blocks BL generated based on the boundary area BA illustrated in FIG. 6, according to an embodiment.

In an embodiment and referring to FIGS. 3 and 7, the compensation data generator 146 may generate block compensation data CD_BL for decreasing the luminance values LV for the blocks BL included in the boundary area BA and a peripheral area PA disposed adjacent to the boundary area BA in the first direction DR1.

In an embodiment, the peripheral area PA may include two block columns disposed adjacent to the boundary area BA in the first direction DR1. For example, as illustrated in FIG. 7, when the boundary area BA includes the 8th and 9th block columns C8 and C9, the peripheral area PA may include 7th and 10th block columns C7 and C10. However, the invention is not limited thereto, and the peripheral area PA may include four or more block columns disposed adjacent to the boundary area BA in the first direction DR1 (e.g., 6th, 7th, 10th, and 11th blocks).

In an embodiment, the block compensation data CD_BL may include gain values for the blocks BL. The gain value for each of the blocks BL included in the boundary area BA may be a first gain value G1, the gain value for each of the blocks BL included in the peripheral area PA may be a second gain value G2, and the gain value for each of the blocks BL included in a non-boundary area NBA excluding the boundary area BA and the peripheral area PA may be 1. The second gain value G2 may be greater than 0 and less than 1. The first gain value G1 may be greater than 0 and less than the second gain value G2.

Figure 8:
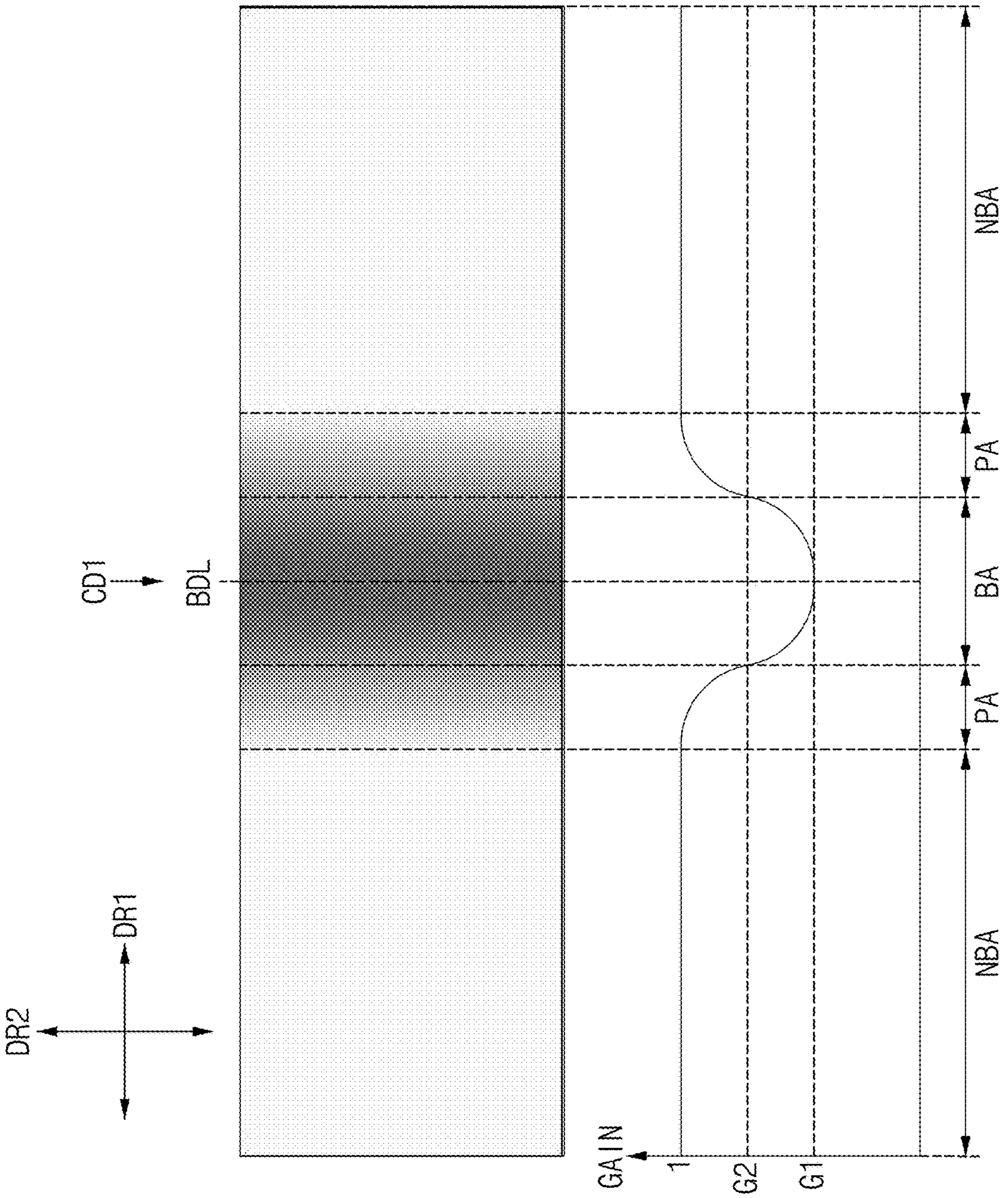
FIG. 8 is a gain graph illustrating first compensation data for pixels generated based on the block compensation data in FIG. 7, according to an embodiment.

FIG. 8 is a gain diagram illustrating first compensation data CD1 for the pixels PX generated based on the block compensation data CD_BL in FIG. 7, according to an embodiment.

In an embodiment and referring to FIGS. 1, 3, and 8, the compensation data CD may include first compensation data CD1, and the compensation data generator 146 may generate the first compensation data CD1 for gradually decreasing the luminance values for the pixels PX included in the boundary area BA and the peripheral area PA along the first direction DR1 toward the boundary line BDL. The boundary line BDL may be located in the boundary area BA, and may extend in the second direction DR2. For example, the boundary line BDL may cross a center of the boundary area BA in the first direction DR1.

In an embodiment, the first compensation data CD1 may include gain values for the pixels PX. The compensation data generator 146 may generate the gain values for the pixels PX included in the first compensation data CD1 based on the gain values for the blocks BL included in the block compensation data CD_BL. The gain value for each of the pixels PX located in the non-boundary area NBA may be 1, the gain values for the pixels PX located in the peripheral area PA may gradually decrease from 1 to the second gain value G2 along the first direction DR1 from a boundary between the non-boundary area NBA and the peripheral area PA toward a boundary between the peripheral area PA and the boundary area BA, and the gain values for the pixels PX located in the boundary area BA may gradually decrease from the second gain value G2 to the first gain value G1 along the first direction DR1 from the boundary between the peripheral area PA and the boundary area BA toward the boundary line BDL.

Figure 9:
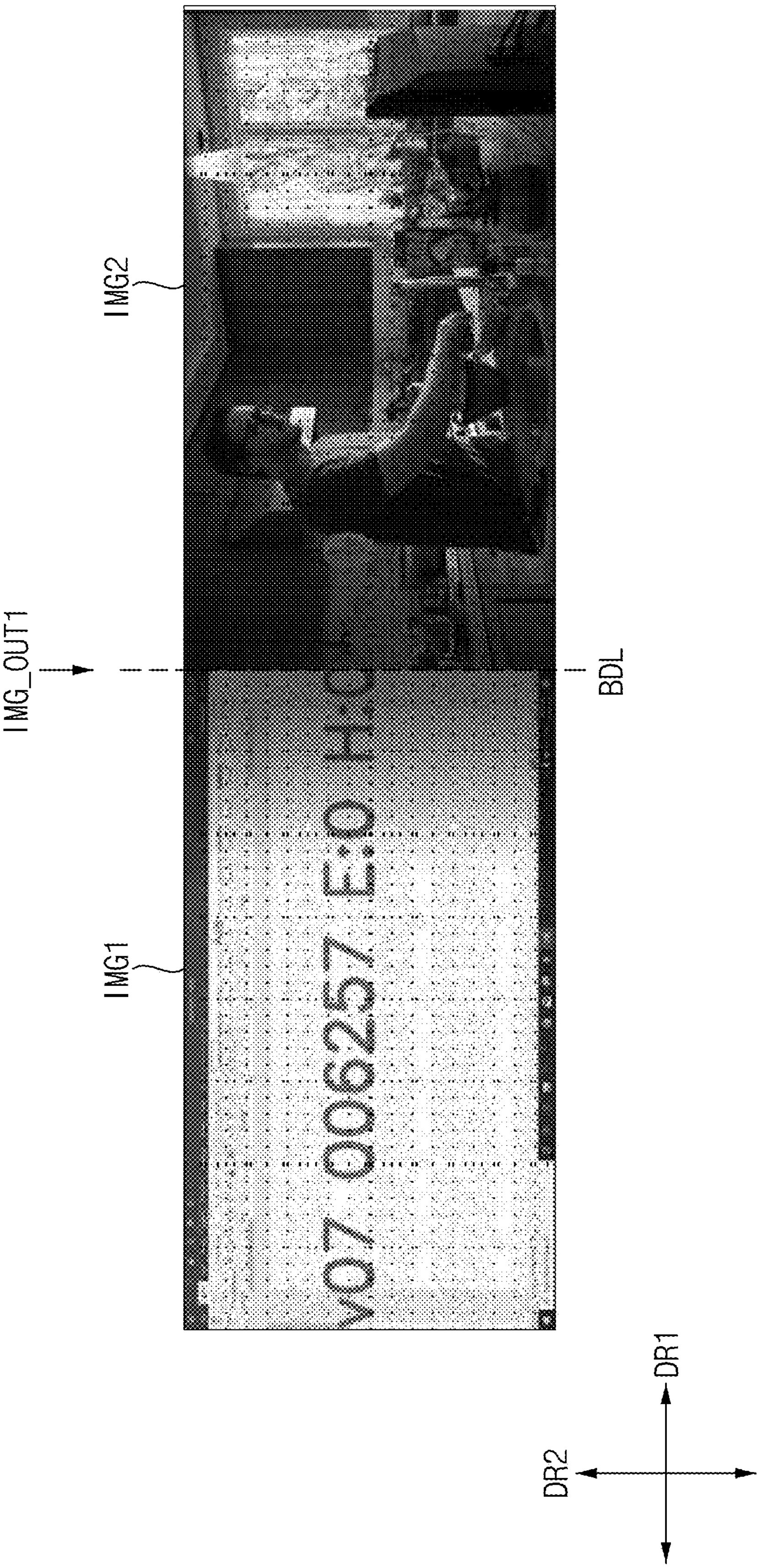
FIG. 9 is a graphic diagram illustrating an example of an output image corresponding to output image data output from the driving controller in FIG. 3, according to an embodiment.

FIG. 9 is a graphic illustrating an example of an output image IMG_OUT1 corresponding to the output image data OID output from the driving controller 140 in FIG. 3, according to an embodiment.

In an embodiment and referring to FIGS. 3, 8, and 9, the data compensator 147 may generate the output image data OID based on the input image data IID and the first compensation data CD1. In an embodiment, the data compensator 147 may calculate grayscale values of the output image data OID by multiplying grayscale values of the input image data IID by the gain values of the first compensation data CD1. Since the gain values of the first compensation data CD1 corresponding to the boundary area BA and the peripheral area PA are less than 1, in the boundary area BA and the peripheral area PA, a luminance of the output image IMG_OUT1 in FIG. 9 may be lower than a luminance of the input image IMG_IN in FIG. 4.

In an embodiment, when the input image IMG_IN corresponding to the input image data IID is displayed for a long time without compensation of the input image data IID, an afterimage (or stain) corresponding to content displayed by the input image IMG_IN may be recognized from the display panel 110. Specifically, as illustrated in FIG. 4, when the input image IMG_IN includes the first image IMG1 and the second image IMG2, which display different contents, with the boundary line BDL extending in the second direction DR2 in between, an afterimage in the form of a line extending in the second direction DR2 may be generated, and the afterimage in the form of the line extending in the second direction DR2 may be noticeably recognized due to the Mach band effect, which emphasizes the difference in luminance in a boundary between areas having difference luminances.

In an embodiment, when the input image IMG_IN including the first image IMG1 and the second image IMG2 that display different contents with the boundary line BDL extending in the second direction DR2 in between is displayed for a long time, the driving controller 140 may determine the boundary area BA based on the input image data IID, may generate the compensation data CD for gradually decreasing the luminance values for the pixels PX included in the boundary area BA and peripheral area PA along the first direction DR1 toward the boundary line BDL, and may generate the output image data OID based on the input image data IID and the compensation data CD, so that the output image IMG_OUT1 in which the luminance gradually decreases in the first direction DR1 toward the boundary line BDL near the boundary line BDL may be displayed as illustrated in FIG. 9. Accordingly, the occurrence of the afterimage (or stain) near the boundary line BDL between the first image IMG1 and the second image IMG2 displaying different contents may be delayed.

Hereinafter, the generation of the compensation data CD based on the boundary area BA according to another embodiment will be described with reference to FIGS. 10 to 12. Descriptions of components of the generation of the compensation data CD described with reference to FIGS. 10 to 12, which are substantially the same as or similar to those of the generation of the compensation data CD described with reference to FIGS. 7 to 9, will be omitted.

Figure 10:
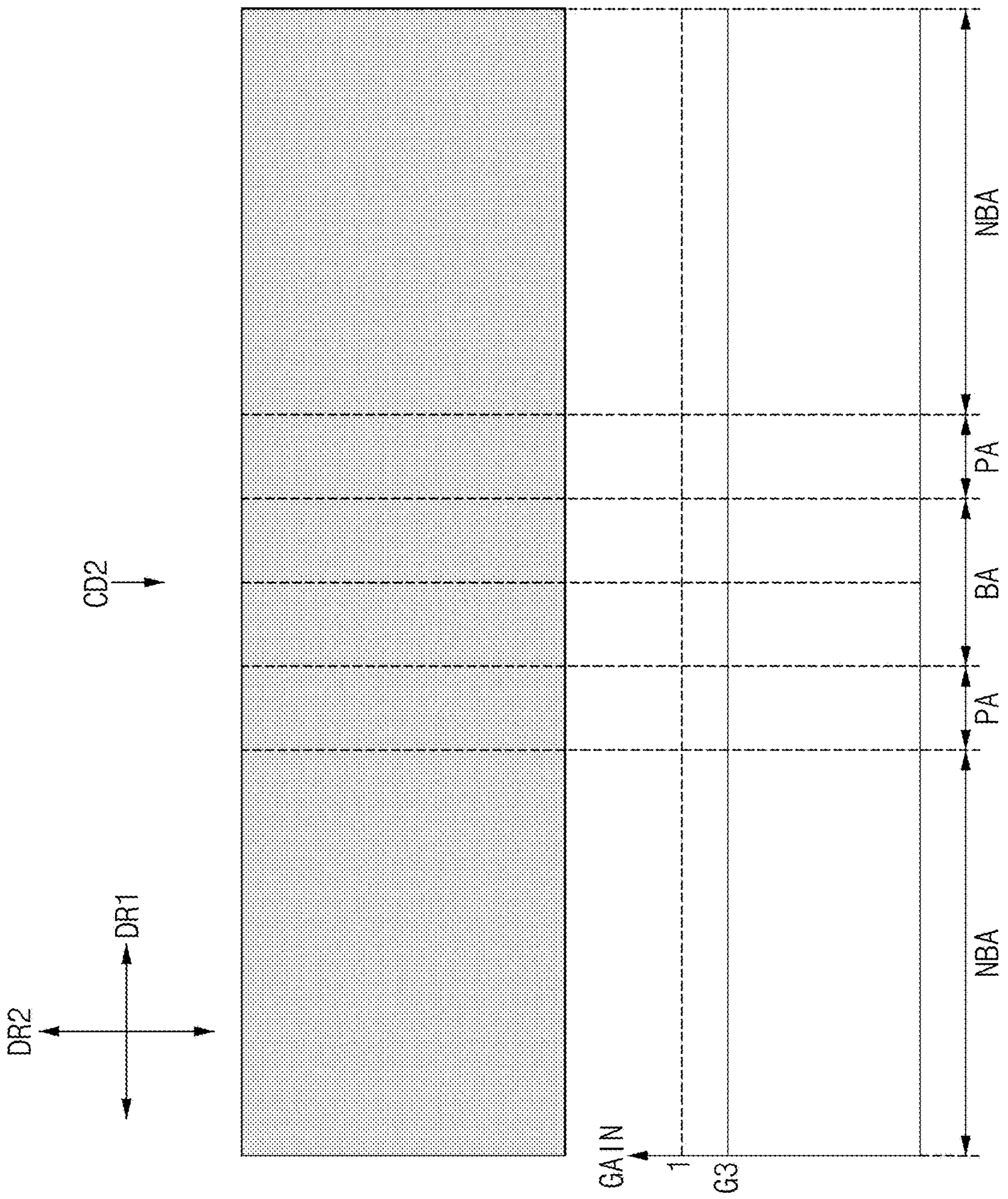
FIG. 10 is a gain graph illustrating second compensation data for the pixels, according to an embodiment.
Figure 11:
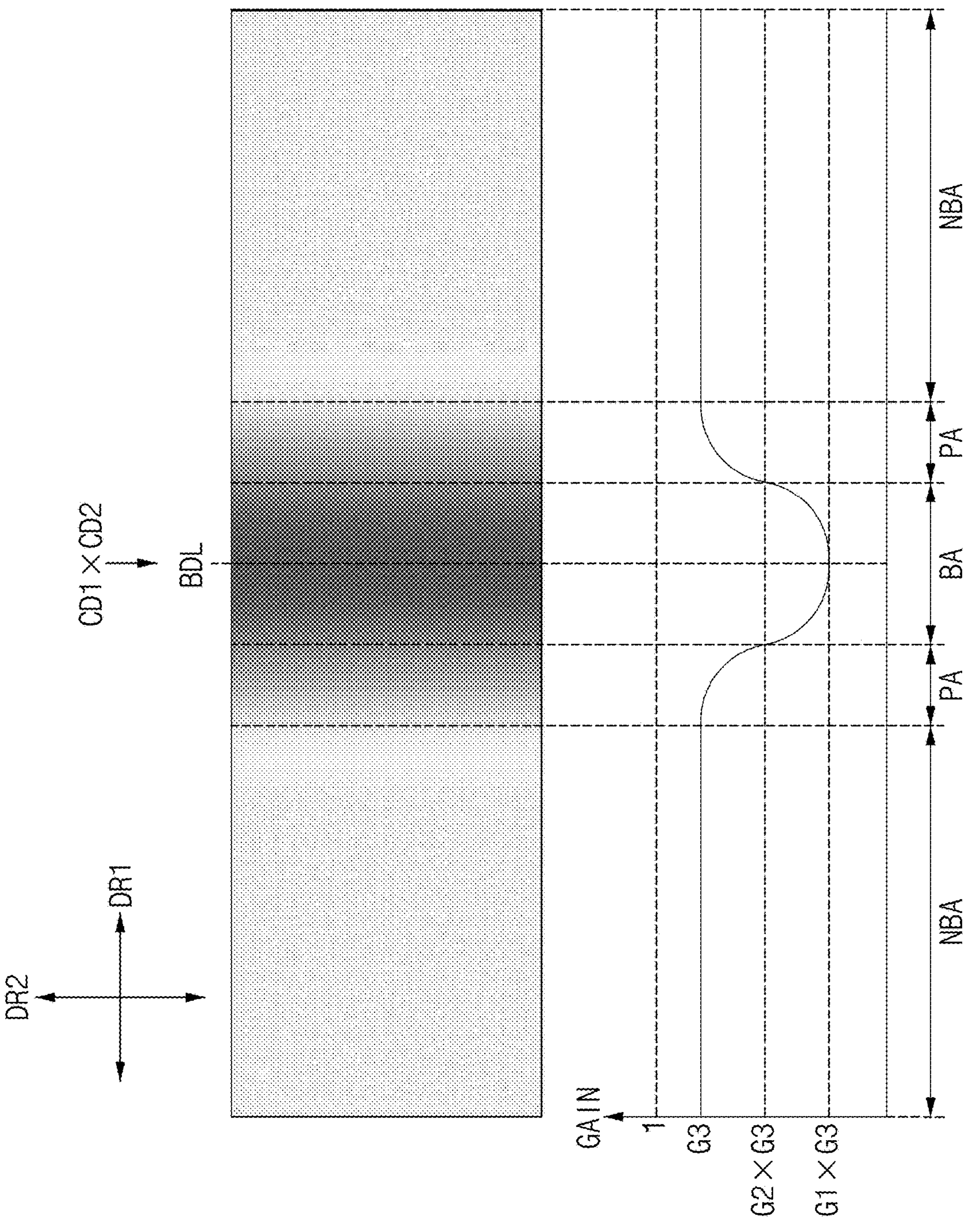
FIG. 11 is a gain graph illustrating a product of the first compensation data and the second compensation data for the pixels, according to an embodiment.

FIG. 10 is a diagram illustrating second compensation data CD2 for the pixels PX, in accordance with an embodiment. FIG. 11 is a diagram illustrating a product of the first compensation data CD1 and the second compensation data CD2 for the pixels, according to an embodiment.

In an embodiment and referring to FIGS. 3, 8, 10, and 11, the compensation data CD may include first compensation data CD1 and second compensation data CD2, and the compensation data generator 146 may generate the first compensation data CD1 for gradually decreasing the luminance values for the pixels PX included in the boundary area BA and the peripheral area PA along the first direction DR1 toward the boundary line BDL and the second compensation data CD2 for uniformly decreasing the luminance values for the pixels PX included in the display panel 110.

In an embodiment, the second compensation data CD2 may include gain values for the pixels PX. The gain value for each of the pixels PX included in the display panel 110 may be a third gain value G3. The third gain value G3 may be greater than 0 and less than 1. In an embodiment, the third gain value G3 may be greater than the second gain value G2.

In an embodiment, when the gain values of the first compensation data CD1 are multiplied by the gain values of the second compensation data CD2, the gain value for each of the pixels PX located in the non-boundary area NBA may be the third gain value G3. The gain values for the pixels PX located in the peripheral area PA may gradually decrease from the third gain value G3 to a product (G2×G3) of the second gain value G2 and the third gain value G3 along the first direction DR1 from the boundary between the non-boundary area NBA and the peripheral area PA toward the boundary between the peripheral area PA and the boundary area BA, and the gain values for the pixels PX located in the boundary area BA may gradually decrease from the product (G2×G3) of the second gain value G2 and the third gain value G3 to a product (G1×G3) of the first gain value G1 and the third gain value G3 along the first direction DR1 from the boundary between the peripheral area PA and the boundary area BA toward the boundary line BDL.

Figure 12:
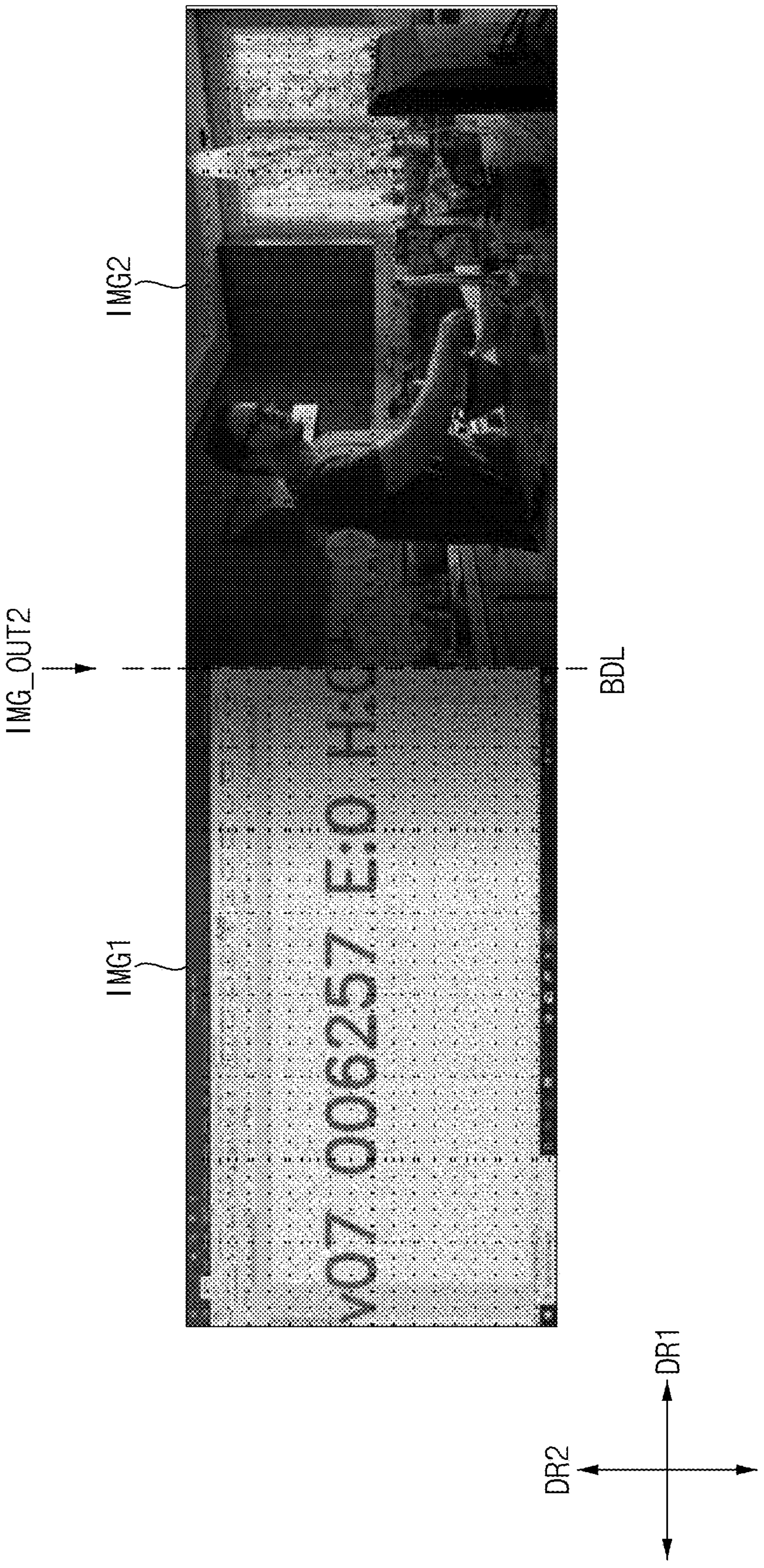
FIG. 12 is a graphic diagram illustrating another example of the output image corresponding to the output image data output from the driving controller in FIG. 3, according to an embodiment.

FIG. 12 is a graphic illustrating another example of the output image IMG_OUT2 corresponding to the output image data OID output from the driving controller 140 in FIG. 3, according to an embodiment.

In an embodiment and referring to FIGS. 3, 8, 10, 11, and 12, the data compensator 147 may generate the output image data OID based on the input image data IID, the first compensation data CD1, and the second compensation data CD2. In an embodiment, the data compensator 147 may calculate the grayscale values of the output image data OID by multiplying the grayscale values of the input image data IID by the gain values of the first compensation data CD1 and the gain values of the second compensation data CD2. Since the gain values of the second compensation data CD2 corresponding to an entire area including the boundary area BA, the peripheral area PA, and the non-boundary area NBA are less than 1, a luminance of the output image IMG_OUT2 in FIG. 12 may be lower than the luminance of the input image IMG_IN in FIG. 4 in the non-boundary area NBA, and a luminance of the output image IMG_OUT2 in FIG. 12 may be lower than the luminance of the output image IMG_OUT1 in FIG. 9 in the boundary area BA and the peripheral area PA.

In an embodiment and as illustrated in FIG. 12, not only does the luminance gradually decrease in the first direction DR1 around the boundary line BDL of the output image IMG_OUT2 toward the boundary line BDL, but additionally the luminance may be uniformly decreased throughout the output image IMG_OUT2. Accordingly, the occurrence of afterimage (or stain) near the boundary line BDL between the first image IMG1 and the second image IMG2 displaying different contents may be further delayed, and a decrease in luminance of the output image IMG_OUT2 may not be recognized by the user.

Hereinafter, the generation of the compensation data CD based on the boundary area BA according to another embodiment will be described with reference to FIGS. 13 and 14. Descriptions of components of the generation of the compensation data CD described with reference to FIGS. 13 and 14, which are substantially the same as or similar to those of the generation of the compensation data CD described with reference to FIGS. 7 to 9, will be omitted.

Figure 13:
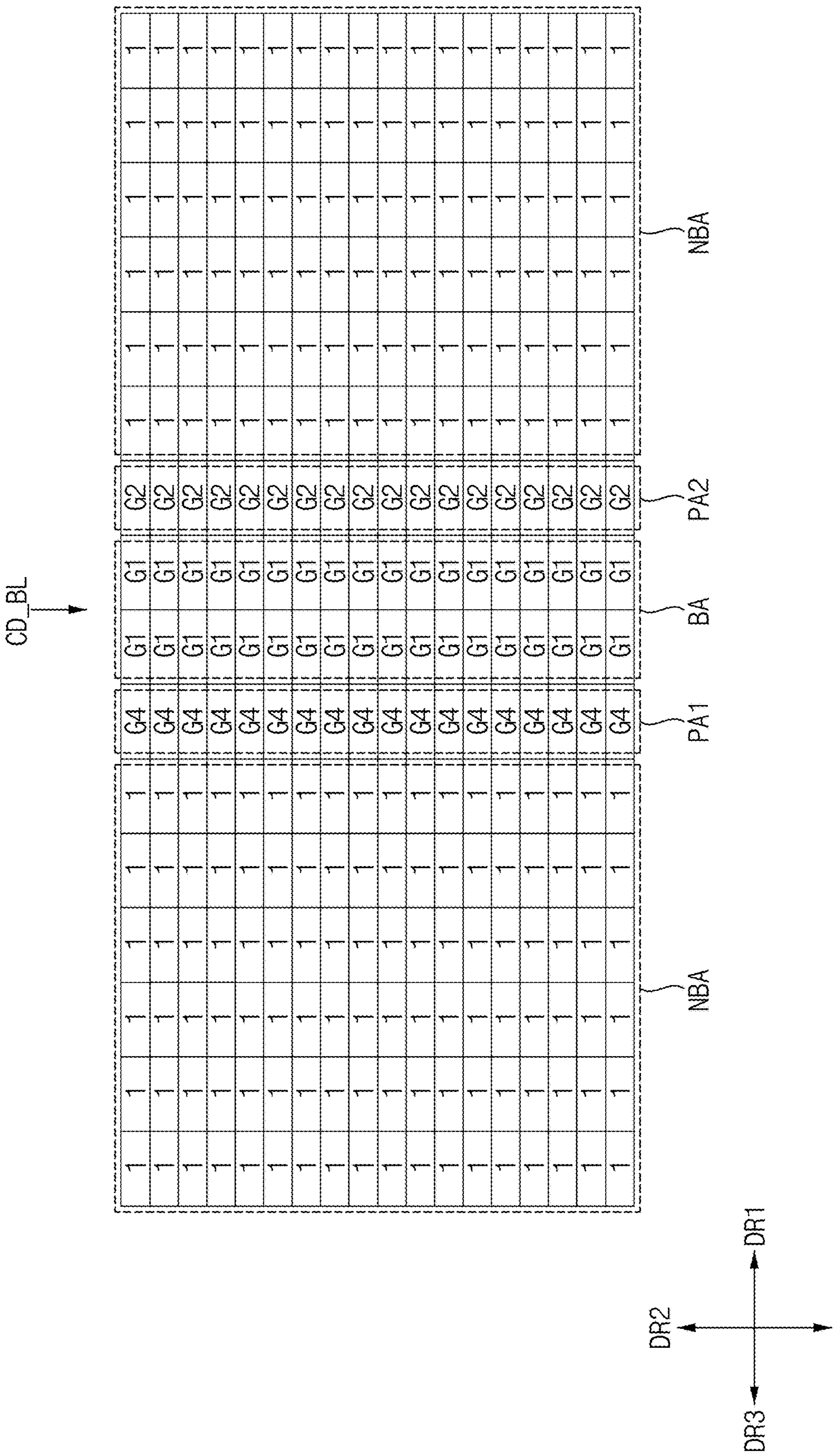
FIG. 13 is a block diagram illustrating another example of the block compensation data for the blocks generated based on the boundary area illustrated in FIG. 6, according to an embodiment.

FIG. 13 is a diagram illustrating another example of the block compensation data CD_BL for the blocks BL generated based on the boundary area BA illustrated in FIG. 6, according to an embodiment.

In an embodiment and referring to FIGS. 3 and 13, the compensation data generator 146 may generate the block compensation data CD_BL for decreasing the luminance values LV for the blocks BL included in the boundary area BA, a first peripheral area PA1 disposed adjacent to the boundary area BA in a third direction DR3 directed opposite to the first direction DR1, and a second peripheral area PA2 disposed adjacent to the boundary area BA in the first direction DR1.

In an embodiment, the block compensation data CD_BL may include gain values for the blocks BL. The gain value for each of the blocks BL included in the boundary area BA may be the first gain value G1, the gain value for each of the blocks BL included in the first peripheral area PA1 may be a fourth gain value G4, the gain value for each of the blocks BL included in the second peripheral area PA2 may be the second gain value G2, and the gain value for each of the blocks BL included in the non-boundary area NBA may be 1. The fourth gain value G4 may be greater than 0 and less than 1. The fourth gain value G4 may be greater or less than the second gain value G2.

Figure 14:
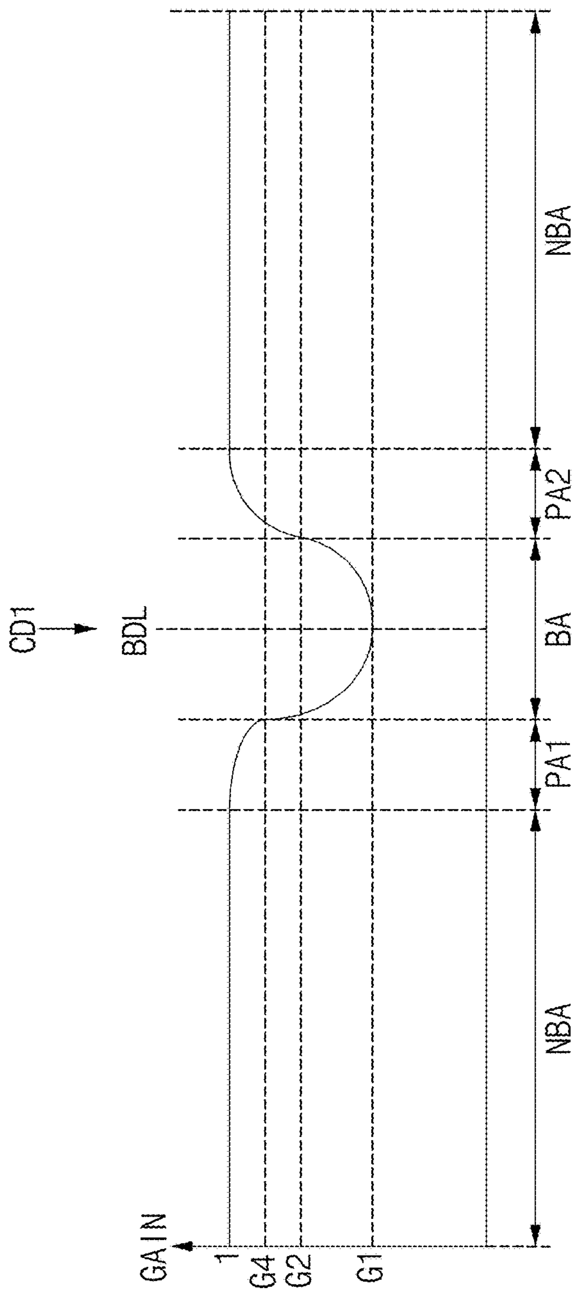
FIG. 14 is a gain diagram illustrating the first compensation data for the pixels generated based on the block compensation data in FIG. 13, according to an embodiment.

FIG. 14 is a gain diagram illustrating the first compensation data CD1 for the pixels PX generated based on the block compensation data CD_BL in FIG. 13.

In an embodiment and referring to FIGS. 1, 3, and 14, the compensation data CD may include the first compensation data CD1, and the compensation data generator 146 may generate the first compensation data CD1 for gradually decreasing the luminance values for the pixels PX included in the boundary area BA, the first peripheral area PA1, and the second peripheral area PA2 along the first direction DR1 toward the boundary line BDL.

In an embodiment, the first compensation data CD1 may include gain values for the pixels PX. The compensation data generator 146 may generate the gain values for the pixels PX included in the first compensation data CD1 based on the gain values for the blocks BL included in the block compensation data CD_BL. The gain value for each of the pixels PX located in the non-boundary area NBA may be 1, the gain values for the pixels PX located in the first peripheral area PA1 may gradually decrease from 1 to the fourth gain value G4 along the first direction DR1 from the boundary between the non-boundary area NBA and the first peripheral area PA1 toward a boundary between the first peripheral area PA1 and the boundary area BA, the gain values for the pixels PX located in the second peripheral area PA2 may gradually decrease from 1 to the second gain value G2 along the first direction DR1 from the a boundary between the non-boundary area NBA and the second peripheral area PA2 toward a boundary between the second peripheral area PA2 and the boundary area BA, the gain values for the pixels PX located between the boundary between the first peripheral area PA1 and the boundary area BA and the boundary line BDL may gradually decrease from the fourth gain value G4 to the first gain value G1 along the first direction DR1 from the boundary between the first peripheral area PA1 and the boundary area BA toward the boundary line BDL, and the gain values for the pixels PX located between the boundary between the second peripheral area PA2 and the boundary area BA and the boundary line BDL may gradually decrease from the second gain value G2 to the first gain value G1 along the first direction DR1 from the boundary between the second peripheral area PA2 and the boundary area BA toward the boundary line BDL.

In an embodiment, as illustrated in FIG. 14, the fourth gain value G4 may be greater than the second gain value G2, and when the input image data IID corresponding to the input image IMG_IN illustrated in FIG. 4 is provided to the driving controller 140 for a plurality of frame periods, the decrease in luminance of the first image IMG1 may be less than the decrease in luminance of the second image IMG2. Accordingly, the decrease in luminance of the first image IMG1, which has a luminance higher than a luminance of the second image IMG2, may not be visible to the user. Further, in another embodiment, the fourth gain value G4 may be less than the second gain value G2, and when the input image data IID corresponding to the input image IMG_IN illustrated in FIG. 4 is provided to the driving controller 140 for a plurality of frame periods, the decrease in luminance of the first image IMG1 may be greater than the decrease in luminance of the second image IMG2. Accordingly, the occurrence of the afterimage (or stain) due to the first image IMG1, which has a luminance higher than a luminance of the second image IMG2, may be further delayed.

Figure 15:
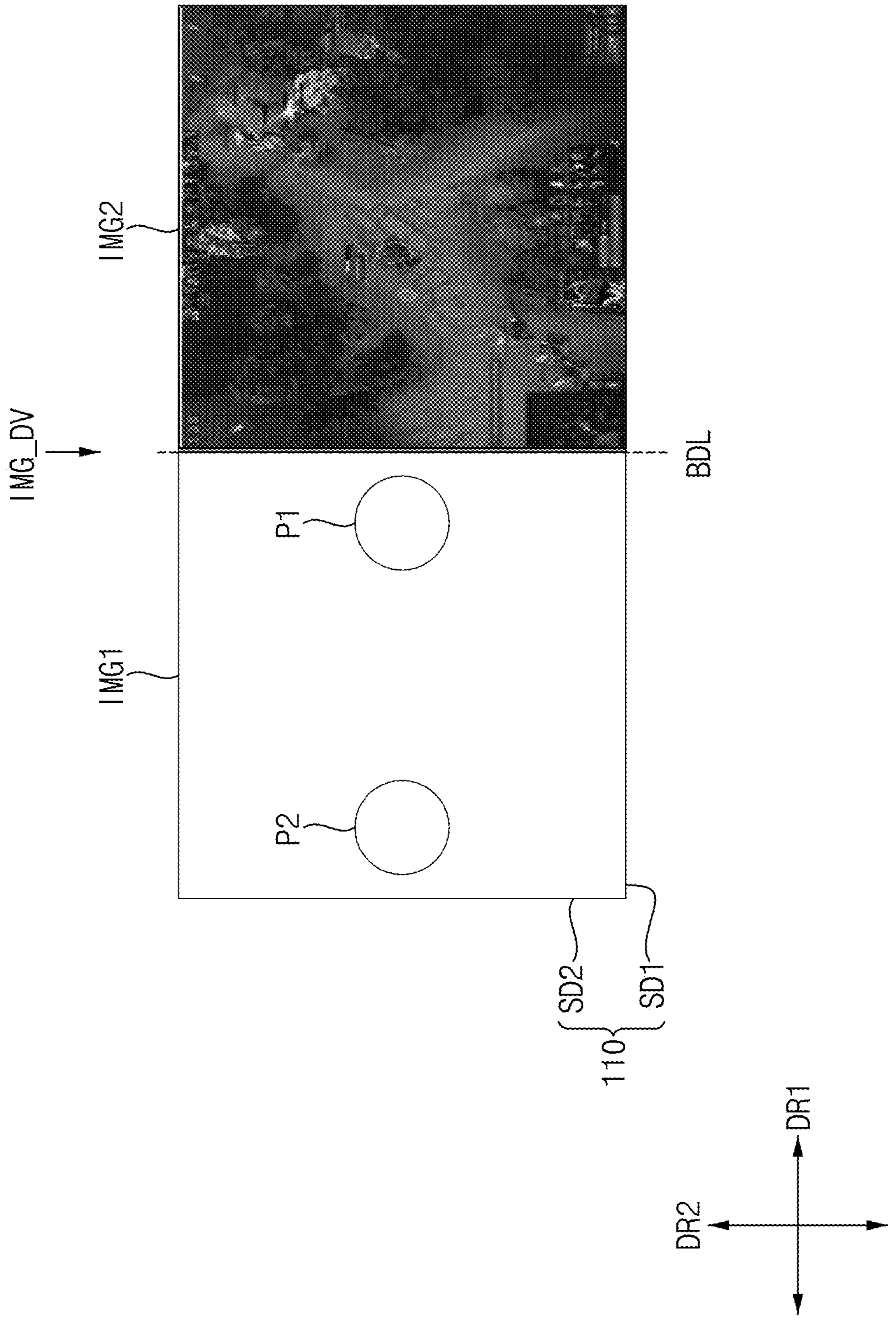
FIG. 15 is a graphic diagram illustrating an example of a split image displayed by the display panel included in the display device in FIG. 1, according to an embodiment.

FIG. 15 is a graphic illustrating an example of a split image IMG_DV displayed by the display panel 110 included in the display device 100 in FIG. 1, according to an embodiment.

In an embodiment and referring to FIGS. 1 and 15, when the display panel 110 displays a first image IMG1 and a second image IMG2 with the boundary line BDL extending in the second direction DR2 in between and the grayscale values of the input image data IID corresponding to the first image IMG1 are equal, a measured luminance of a first portion P1 of the first image IMG1 disposed adjacent to the boundary line BDL may be lower than a measured luminance of the second portion P2 of the first image IMG1 located farther away from the boundary line BDL than the first portion P1 in the first direction DR1.

In an embodiment, when the display panel 110 displays the first image IMG1 and the second image IMG2 with the boundary line BDL extending in the second direction DR2 in between for a long period of time and the grayscale values of the input image data IID corresponding to the first image IMG1 are equal, since the first portion P1 of the first image IMG1 is located closer to the boundary line BDL in the first direction DR1 than the second portion P2 of the first image IMG1, the gain values of the compensation data CD multiplied by the grayscale values of the input image data IID corresponding to the first portion P1 of the first image IMG1 may be less than the gain values of the compensation data CD multiplied by the grayscale values of the input image data IID corresponding to the second portion P2 of the first image IMG1. Accordingly, the grayscale values of the output image data OID corresponding to the first portion P1 of the first image IMG1 may be less than the grayscale values of the output image data OID corresponding to the second portion P2 of the first image IMG1, and the measured luminance of the first portion P1 of the first image IMG1 may be lower than the measured luminance of the second portion P2 of the first image IMG1.

In an embodiment, the first direction DR1 may be parallel to a long side SD1 of the display panel 110, and the second direction DR2 may be parallel to a short side SD2 of the display panel 110. When the display panel 110 has a rectangular planar shape with opposite long sides SD1 facing each other and opposite short sides SD2 facing each other, the user may use the display device 100 by dividing the display device 100 into two areas with the boundary line BDL extending parallel to the short side SD2 in between.

Figure 16:
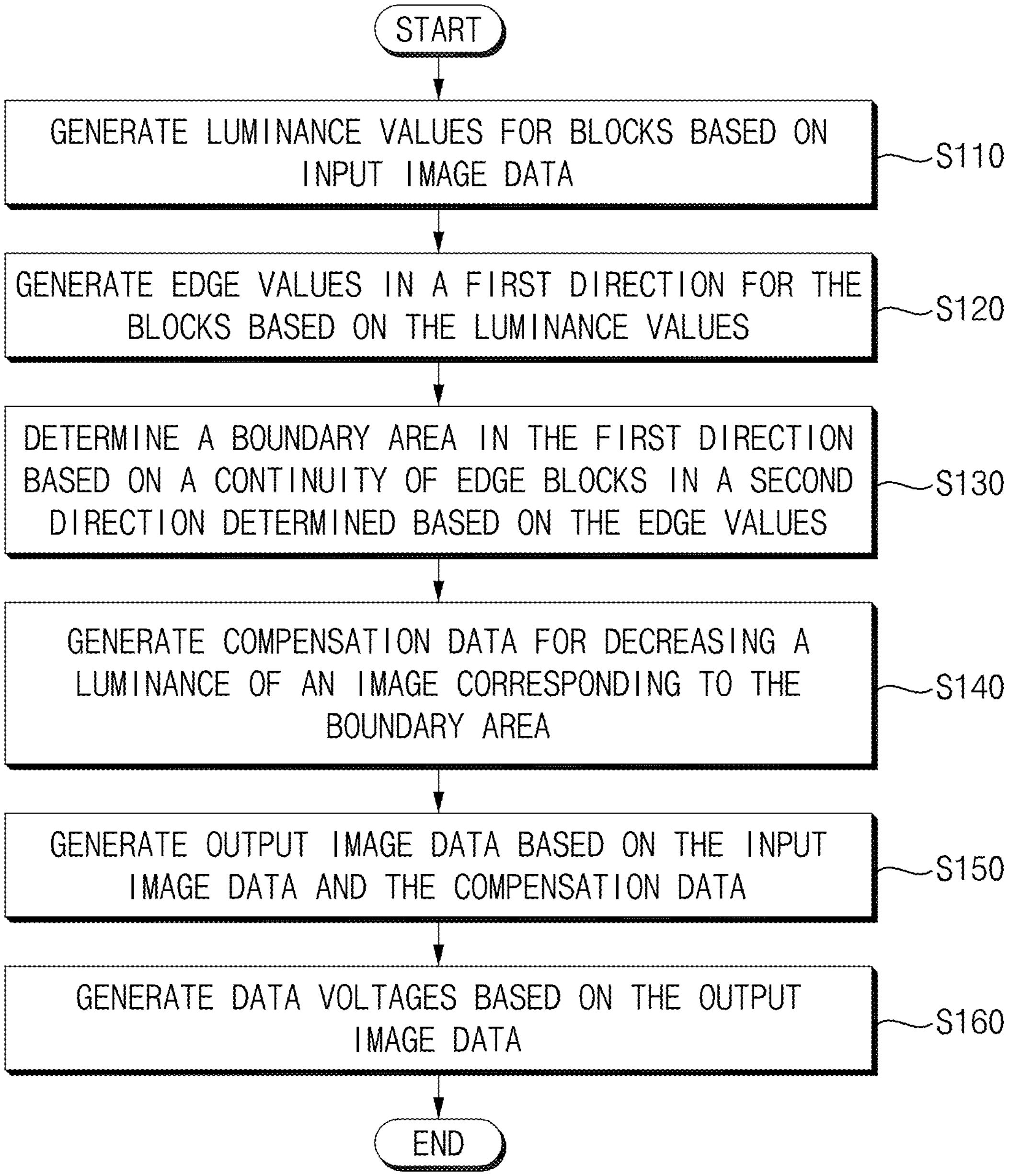
FIG. 16 is a flowchart illustrating a method of driving a display device, according to an embodiment.

FIG. 16 is a flowchart illustrating a method of driving a display device, according to an embodiment.

In an embodiment and referring to FIGS. 1, 3, and 16, a method of driving the display device 100 is provided, where the luminance generator 141 of the driving controller 140 may generate the luminance values LV for the blocks BL based on the input image data IID (S110). The luminance generator 141 may generate the luminance values LV for each frame period. A luminance value LV for a block BL may be an average of luminance values corresponding to grayscale values of the input image data IID for pixels PX included in the block BL.

In an embodiment, the edge generator 142 of the driving controller 140 may generate the edge values EV in the first direction DR1 for the blocks BL based on the luminance values LV for the blocks BL (S120). The edge generator 142 may generate the edge values EV for each frame period.

In an embodiment, the edge generator 142 may generate the edge values EV for the blocks BL by filtering the luminance values LV for the blocks BL in the first direction DR1 using a high pass filter. In an embodiment, the high pass filter may be [−1, 2, −1].

In an embodiment, the determiner 143 of the driving controller 140 may determine the boundary area BA in the first direction DR1 based on the continuity of the edge blocks in the second direction DR2 which is determined based on the edge values EV for the blocks BL (S130).

Figure 17:
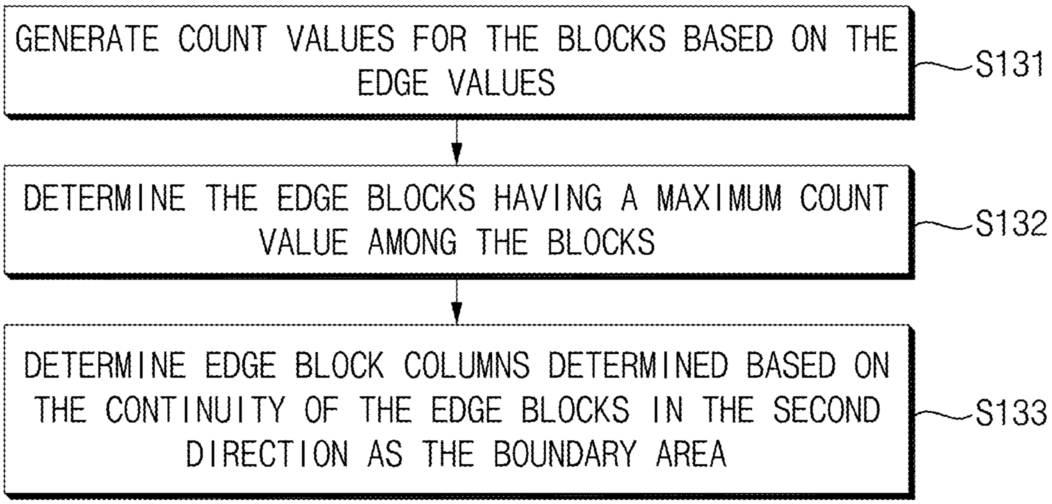
FIG. 17 is a flowchart illustrating a step of determining the boundary area included in the method of driving the display device in FIG. 16, according to an embodiment.

FIG. 17 is a flowchart illustrating the step of determining the boundary area (S130) included in the method of driving the display device in FIG. 16, according to an embodiment. In an embodiment and referring to FIGS. 1, 3, and 17, the count generator 143-1 of the driving controller 140 may generate the count values CV for the blocks BL based on the edge values EV for the blocks BL (S131). The count generator 143 may generate the count values CV for each frame period.

Figure 18:
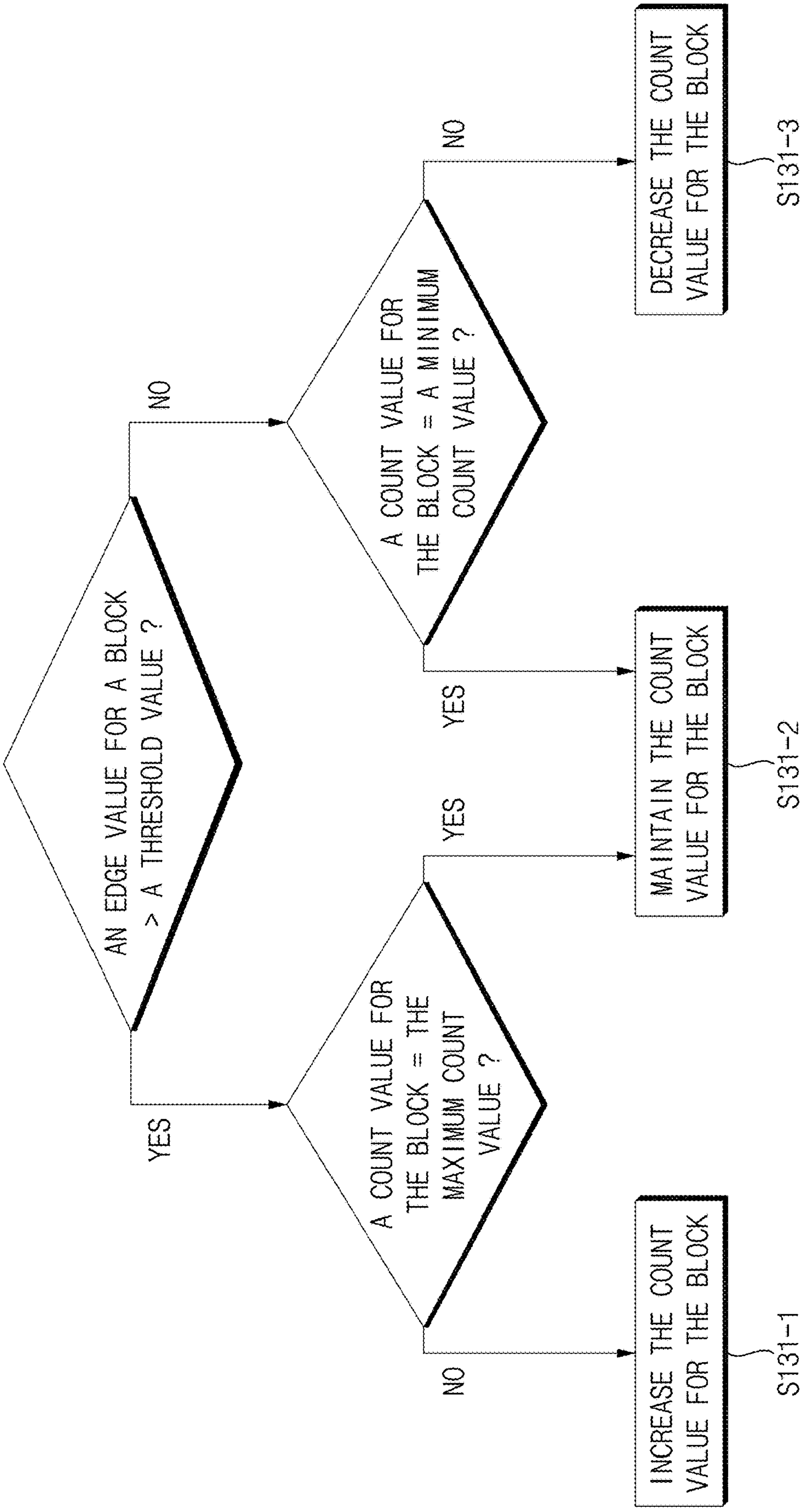
FIG. 18 is a flowchart illustrating a step of generating the count values included in the step of determining the boundary area in FIG. 17, according to an embodiment.

FIG. 18 is a flowchart illustrating the step of generating the count values (S131) included in the step of determining the boundary area in FIG. 17, according to an embodiment.

In an embodiment and referring to FIGS. 1, 3, and 18, the count generator 143-1 may increase the count value CV for the block BL when the edge value EV for the block BL is greater than the threshold value and the count value CV for the block BL is less than the maximum count value (S131-1). In an embodiment, the count generator 143-1 may add 1 to the count value CV for the block BL when the edge value EV for the block BL is greater than the threshold value and the count value CV for the block BL is less than the maximum count value.

In an embodiment, the count generator 143-1 may maintain the count value CV for the block BL when the edge value EV for the block BL is greater than the threshold value and the count value CV for the block BL is equal to the maximum count value (S131-2).

In an embodiment, the count generator 143-1 may decrease the count value CV for the block BL when the edge value EV for the block BL is less than or equal to the threshold value and the count value CV for the block BL is greater than the minimum count value (S131-3). In an embodiment, the count generator 143-1 may add −1 to the count value CV for the block BL when the edge value EV for the block BL is less than or equal to the threshold value and the count value CV for the block BL is greater than the minimum count value.

In an embodiment, the count generator 143-1 may maintain the count value CV for the block BL when the edge value EV for the block BL is less than or equal to the threshold value and the count value CV for the block BL is equal to the minimum count value (S131-2).

In an embodiment and referring to FIGS. 1, 3, and 17 again, the boundary determiner 143-2 of the driving controller 140 may determine the edge blocks having the maximum count value among the blocks BL (S132). Accordingly, blocks BL in which the edge value EV is greater than the threshold value over a plurality of frame periods may be determined as the edge blocks. The boundary determiner 143-2 may determine the edge block columns based on the continuity of the edge blocks in the second direction DR2 as the boundary area BA (S133). The boundary determiner 143-2 may periodically determine the edge blocks and the edge block columns for a plurality of frame periods.

Figure 19:
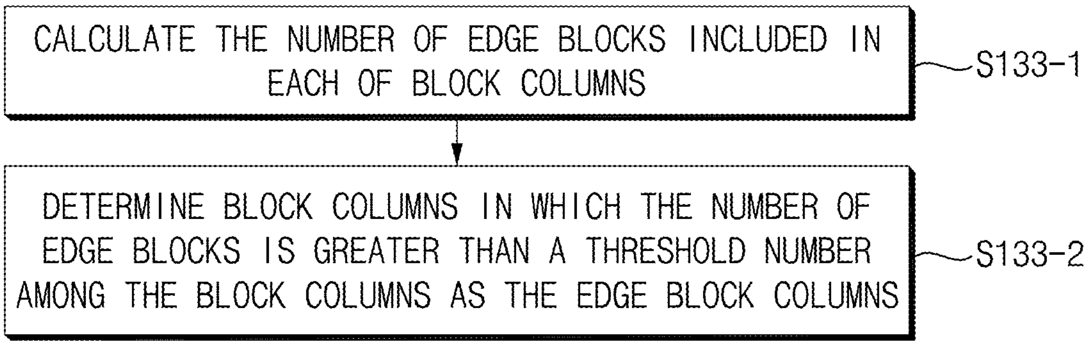
FIG. 19 is a flowchart illustrating a step of determining edge block columns as the boundary area included in the step of determining the boundary area in FIG. 17, according to an embodiment.

FIG. 19 is a flowchart illustrating the step of determining edge block columns as the boundary area S133 included in the step of determining the boundary area in FIG. 17, according to an embodiment.

In an embodiment and referring to FIGS. 1, 3, and 19, the boundary determiner 143-2 may calculate the number of edge blocks included in each of the block columns extending in the second direction DR2 to determine the continuity of the edge blocks in the second direction DR2 (S133-1), and may determine block columns in which the number of edge blocks is greater than a threshold number among the block columns as the edge block columns (S133-2). The threshold number may be a reference for determining the continuity of the edge blocks in the second direction DR2.

In an embodiment, the threshold number may be a half of the number of blocks BL included in each of the block columns. In this case, when the number of edge blocks included in a block column is greater than a half of the number of blocks BL included in the block column, the block column may be determined as the edge block column included in the boundary area BA.

In an embodiment and referring to FIGS. 1, 3, and 16 again, the compensation data generator 146 of the driving controller 140 may generate the compensation data CD for decreasing the luminance of the image based on the boundary area BA (S140). The data compensator 147 of the driving controller 140 may generate the output image data OID based on the input image data IID and the compensation data CD (S150).

Figure 20:
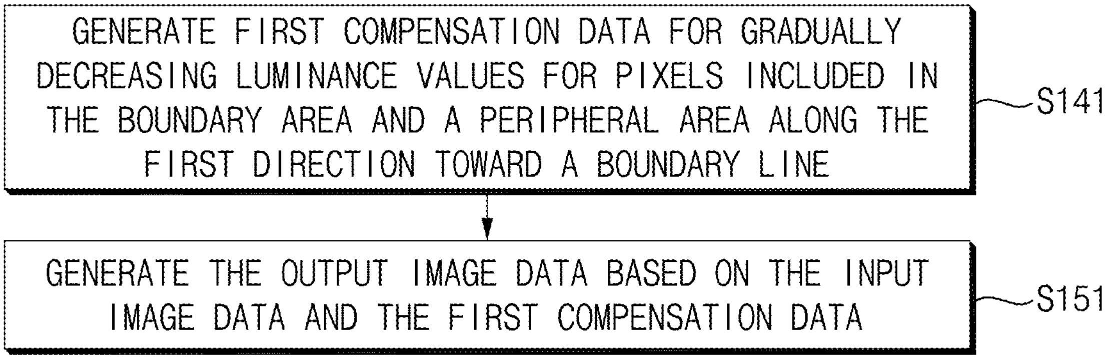
FIG. 20 is a flowchart illustrating an example of a step of generating compensation data and a step of generating the output image data included in the method of driving the display device in FIG. 16, according to an embodiment.

FIG. 20 is a flowchart illustrating an example of the step of generating compensation data (S140) and the step of generating the output image data (S150) included in the method of driving the display device in FIG. 16, according to an embodiment.

In an embodiment and referring to FIGS. 1, 3, 8, and 20, the compensation data CD may include the first compensation data CD1, and the compensation data generator 146 may generate the first compensation data CD1 for gradually decreasing the luminance values for the pixels PX included in the boundary area BA and the peripheral area PA along the first direction DR1 toward the boundary line BDL (S141).

In an embodiment, the first compensation data CD1 may include gain values for the pixels PX. The gain value for each of the pixels PX located in the non-boundary area NBA may be 1, the gain values for the pixels PX located in the peripheral area PA may gradually decrease from 1 to the second gain value G2 along the first direction DR1 from the boundary between the non-boundary area NBA and the peripheral area PA toward the boundary between the peripheral area PA and the boundary area BA, and the gain values for the pixels PX located in the boundary area BA may gradually decrease from the second gain value G2 to the first gain value G1 along the first direction DR1 from the boundary between the peripheral area PA and the boundary area BA toward the boundary line BDL.

In an embodiment, the data compensator 147 may generate the output image data OID based on the input image data IID and the first compensation data CD1 (S151). In an embodiment, the data compensator 147 may calculate the grayscale values of the output image data OID by multiplying the grayscale values of the input image data IID by the gain values of the first compensation data CD1.

Figure 21:
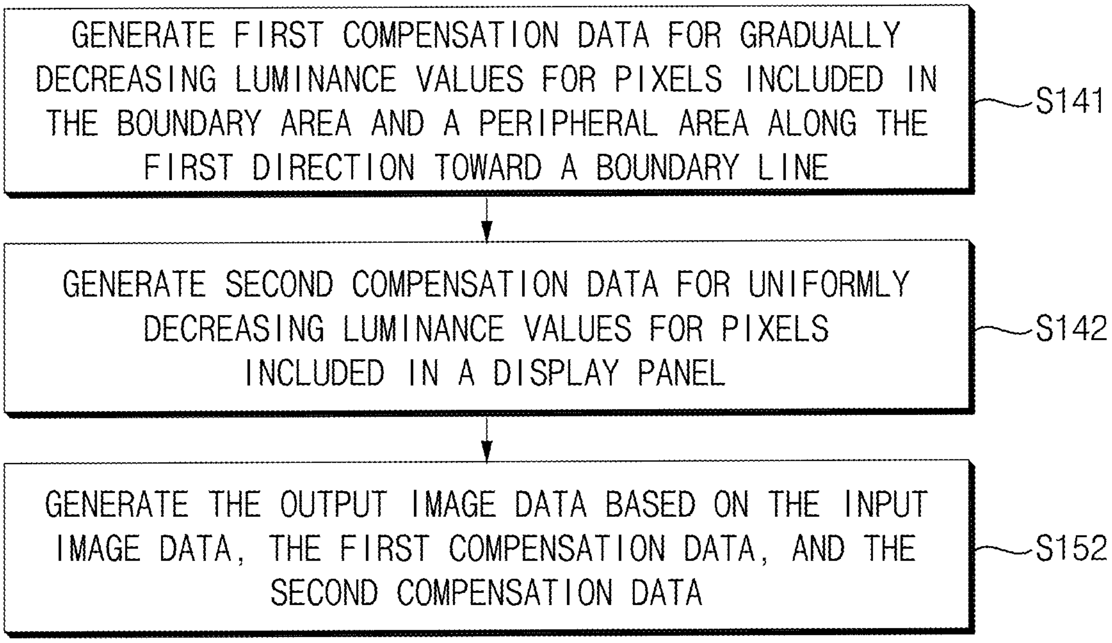
FIG. 21 is a flowchart illustrating another example of the step of generating the compensation data and the step of generating the output image data included in the method of driving the display device in FIG. 16, according to an embodiment.

FIG. 21 is a flowchart illustrating another example of the step of generating the compensation data (S140) and the step of generating the output image data (S150) included in the method of driving the display device in FIG. 16, according to an embodiment.

In an embodiment and referring to FIGS. 1, 3, 8, 10, 11, and 21, the compensation data CD may include the first compensation data CD1 and the second compensation data CD2, and the compensation data generator 146 may generate the first compensation data CD1 for gradually decreasing the luminance values of the pixels PX included in the boundary area BA and the peripheral area PA along the first direction DR1 toward the boundary line BDL (S141). The compensation data generator 146 may generate the second compensation data CD2 for uniformly decreasing the luminance values for the pixels PX included in the display panel 110 (S142).

In an embodiment, the second compensation data CD2 may include gain values for the pixels PX. The gain value for each of the pixels PX included in the display panel 110 may be the third gain value G3.

In an embodiment, the data compensator 147 may generate the output image data OID based on the input image data IID, the first compensation data CD1, and the second compensation data CD2 (S152). In an embodiment, the data compensator 147 may calculate the grayscale values of the output image data OID by multiplying the grayscale values of the input image data IID by the gain values of the first compensation data CD1 and the gain values of the second compensation data CD2.

Referring to FIGS. 1 and 16, the data driver 130 may generate the data voltages VDAT based on the output image data OID (S160), according to an embodiment.

Figure 22:
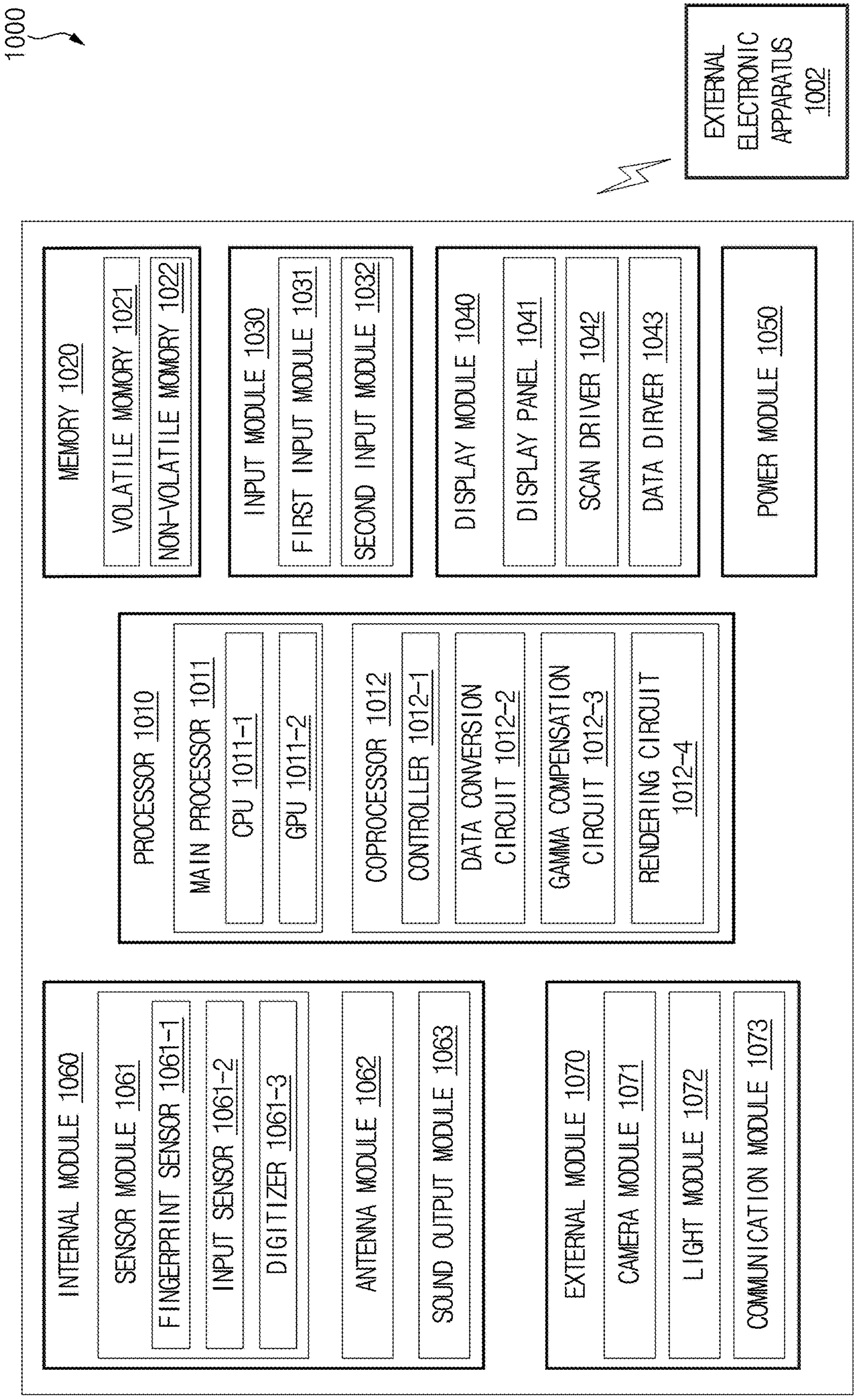
FIG. 22 is a block diagram illustrating an electronic apparatus, according to an embodiment.
Figure 23:
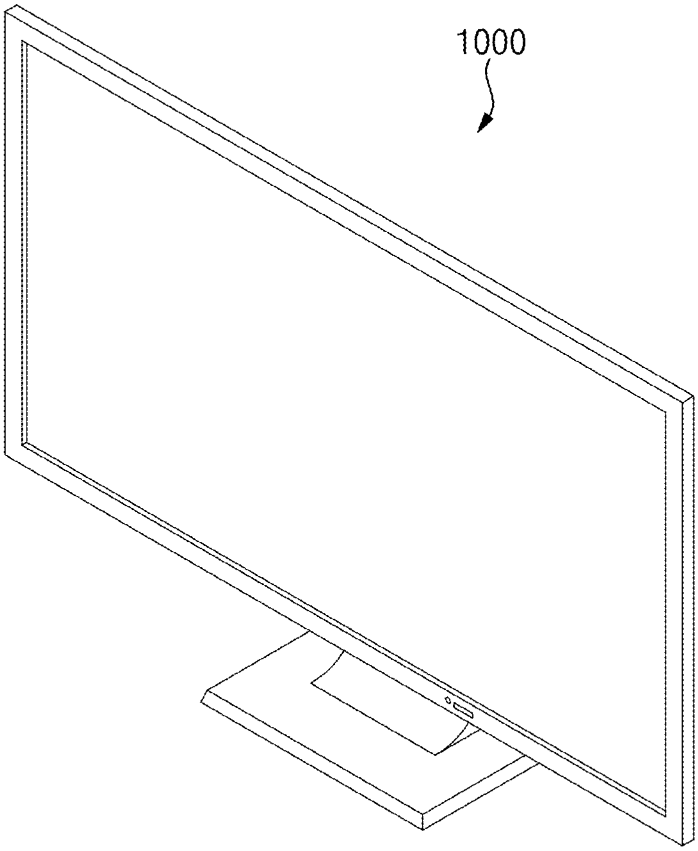
FIG. 23 is an image illustrating an example in which the electronic apparatus in FIG. 22 is implemented as a monitor, according to an embodiment.

FIG. 22 is a block diagram illustrating an electronic apparatus 1000, according to an embodiment. FIG. 23 is a diagram illustrating an example in which the electronic apparatus 1000 in FIG. 22 is implemented as a monitor, according to an embodiment.

In an embodiment and referring to FIGS. 22 and 23, the electronic apparatus 1000 may output various information through a display module 1040 within operating system. When a processor 1010 executes an application stored in a memory 1020, the display module 1040 may provide application information to a user through a display panel 1041.

In an embodiment, as illustrated in FIG. 23, the electronic apparatus 1000 may be implemented as a computer monitor. However, the invention is not limited thereto, and in another embodiment, the electronic apparatus 1000 may be implemented as a television, a mobile phone, a video phone, a smart pad, a smart watch, a tablet PC, a vehicle navigation, a laptop, a head mounted display device, etc.

In an embodiment, the processor 1010 may obtain an external input through an input module 1030 or a sensor module 1061, and may execute an application corresponding to the external input. For example, when the user selects a camera icon displayed on the display panel 1041, the processor 1010 may obtain a user input through an input sensor 1061-2, and may activate a camera module 1071. The processor 1010 may transmit image data corresponding to a captured image acquired through the camera module 1071 to the display module 1040. The display module 1040 may display an image corresponding to the captured image through the display panel 1041. Some of components of the electronic apparatus 1000 may be integrated and provided as one component, or one component may be provided separately into two or more components.

In an embodiment, the electronic apparatus 1000 may communicate with an external electronic apparatus 1002 through a network (e.g., a short-range wireless communication network or a long-range wireless communication network). In an embodiment, the electronic apparatus 1000 may include the processor 1010, the memory 1020, the input module 1030, the display module 1040, a power module 1050, an internal module 1060, and an external module 1070. In an embodiment, the electronic apparatus 1000 may omit at least one of the above-described components, or one or more other components may be added. In an embodiment, some of the above-described components (e.g., a sensor module 1061, an antenna module 1062, or an sound output module 1063) may be integrated into another component (e.g., the display module 1040).

In an embodiment, the processor 1010 may execute software to control at least one other component (e.g., hardware or software component) of the electronic apparatus 1000 connected to the processor 1010, and may perform various data processing or calculation. In an embodiment, as at least part of data processing or calculation, the processor 1010 may store commands or data received from another component (e.g., the input module 1030, the sensor module 1061, or a communication module 1073) in a volatile memory 1021, may process the commands or data stored in the volatile memory 1021, and may store resultant data in a non-volatile memory 1022.

In an embodiment, the processor 1010 may include a main processor 1011 and a coprocessor 1012. The main processor 1011 may include one or more of a central processing unit (CPU) 1011-1 or an application processor (AP). The main processor 1011 may further include one or more of a graphics processing unit (GPU) 1011-2, a communication processor (CP), and an image signal processor (ISP). At least two of the above-described processing unit and processor may be implemented as an integrated component (e.g., a single chip), or each may be implemented as an independent component (e.g., a plurality of chips).

In an embodiment, the coprocessor 1012 may include a controller 1012-1. The controller 1012-1 may include an interface conversion circuit and a timing control circuit. The controller 1012-1 may receive an image signal from the main processor 1011, may convert data format of the image signal to suit the interface specifications with the display module 1040, and may output image data. The controller 1012-1 may output various control signals necessary for driving the display module 1040.

In an embodiment, the coprocessor 1012 may further include a data conversion circuit 1012-2, a gamma compensation circuit 1012-3, a rendering circuit 1012-4, etc. The data conversion circuit 1012-2 may receive the image data from the controller 1012-1, and may compensate the image data such that the image is displayed at a desired brightness according to the characteristics of the electronic apparatus 1000 or the user's settings or may convert the image data to reduce power consumption or compensate for afterimages. The data conversion circuit 1012-2 may include at least one of the luminance generator 141, the edge generator 142, the determiner 143, the compensation data generator 146, and the data compensator 147 in FIG. 3. The gamma compensation circuit 1012-3 may convert the image data or a gamma reference voltage such that an image displayed on the electronic apparatus 1000 has desired gamma characteristics. The rendering circuit 1012-4 may receive the image data from the controller 1012-1, and may render the image data by considering a pixel arrangement of the display panel 1041 applied to the electronic apparatus 1000. At least one of the data conversion circuit 1012-2, the gamma compensation circuit 1012-3, and the rendering circuit 1012-4 may be integrated into another component (e.g., the main processor 1011 or a controller). At least one of the data conversion circuit 1012-2, the gamma compensation circuit 1012-3, and the rendering circuit 1012-4 may be integrated into a data driver 1043 to be described below.

In an embodiment, the memory 1020 may store various data used by at least one component of the electronic apparatus 1000 (e.g., the processor 1010 or the sensor module 1061) and input data or output data for commands related thereto. The memory 1020 may include at least one of the volatile memory 1021 and the non-volatile memory 1022. The memory 1020 may include the memory 144 in FIG. 3.

In an embodiment, the input module 1030 may receive commands or data to be used in components of the electronic apparatus 1000 (e.g., the processor 1010, the sensor module 1061, or the sound output module 1063) from the outside of the electronic apparatus 1000 (e.g., the user or the external electronic apparatus 1002).

In an embodiment, the input module 1030 may include a first input module 1031 through which commands or data are input from the user, and a second input module 1032 through which command or data are input from the external electronic apparatus 1002. The first input module 1031 may include a microphone, a mouse, a keyboard, a key (e.g., button), or a pen (e.g., passive pen or active pen). The second input module 1032 may support a designated protocol that can connect to the external electronic apparatus 1002 by wire or wirelessly. In an embodiment, the second input module 1032 may include a high definition multimedia interface (HDMI), a universal serial bus (USB) interface, an SD card interface, or an audio interface. The second input module 1032 may include a connector that can be physically connected to the external electronic apparatus 1002, for example, an HDMI connector, a USB connector, an SD card connector, or an audio connector (e.g., a headphone connector).

In an embodiment, the display module 1040 may provide visual information to the user. The display module 1040 may include the display panel 1041, a scan driver 1042, and the data driver 1043. The display module 1040 may further include a window, a chassis, and a bracket to protect the display panel 1041. The display module 1040 may correspond to the display device 100 in FIG. 1. The display panel 1041, the scan driver 1042, and the data driver 1043 may correspond to the display panel 110, the gate driver 120, and the data driver 130 in FIG. 1, respectively.

In an embodiment, the power module 1050 may supply power to components of the electronic apparatus 1000. The power module 1050 may include a battery that charges power voltage. The battery may include a non-rechargeable primary cell, a rechargeable secondary cell, or a fuel cell. The power module 1050 may include a power management integrated circuit (PMIC). The PMIC may supply optimized power to each of the above-described modules and the modules described below. The power module 1050 may include a wireless power transmission/reception member electrically connected to the battery. The wireless power transmission/reception member may include a plurality of coil-shaped antenna radiators.

In an embodiment, the electronic apparatus 1000 may further include the internal module 1060 and the external module 1070. The internal module 1060 may include the sensor module 1061, the antenna module 1062, and the sound output module 1063. The external module 1070 may include the camera module 1071, a light module 1072, and a communication module 1073.

In an embodiment, the sensor module 1061 may detect an input by the user's body or an input by the pen among the first input module 1031, and may generate an electrical signal or a data value corresponding to the input. The sensor module 1061 may include at least one of a fingerprint sensor 1061-1, an input sensor 1061-2, and a digitizer 1061-3.

In an embodiment, the processor 1010 may output commands or data to the display module 1040, the sound output module 1063, the camera module 1071, or the light module 1072 based on the input data received from the input module 1030. For example, the processor 1010 may generate image data in response to input data applied through the mouse or the active pen and output the image data to the display module 1040, or may generate command data in response to the input data to output the command data to the camera module 1071 or the light module 1072. When no input data is received from the input module 1030 for a certain period of time, the processor 1010 may switch an operation mode of the electronic apparatus 1000 to a low-power mode or a sleep mode to reduce power consumption of the electronic apparatus 1000.

In an embodiment, the processor 1010 may output commands or data to the display module 1040, the sound output module 1063, the camera module 1071, or the light module 1072 based on sensing data received from the sensor module 1061. For example, the processor 1010 may compare authentication data authorized by the fingerprint sensor 1061-1 with authentication data stored in the memory 1020, and then may execute an application according to the comparison result. The processor 1010 may execute command or output corresponding image data to the display module 1040 based on sensing data detected by the input sensor 1061-2 or the digitizer 1061-3. When the sensor module 1061 includes a temperature sensor, the processor 1010 may receive temperature data for a temperature measured from the sensor module 1061, and may further perform luminance correction for the image data or the like based on the temperature data.

In an embodiment, the display device may be applied to a display device included in a computer, a notebook, a mobile phone, a smart phone, a smart pad, a PMP, a PDA, an MP3 player, or the like.

Although the display devices, the methods of driving the display devices, and the electronic apparatuses according to the embodiments have been described with reference to the drawings, the illustrated embodiments are examples, and may be modified and changed by a person having ordinary knowledge in the relevant technical field without departing from the scope of the invention.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention. Therefore, it is to be understood that the foregoing is illustrative of various embodiments and is not to be construed as limited to the specific embodiments disclosed, and that modifications to the disclosed embodiments, as well as other embodiments, are intended to be included within the scope of the invention. Moreover, the embodiments or parts of the embodiments may be combined in whole or in part without departing from the scope of the invention.

What is claimed is:

1. A method of driving a display device including a display panel which displays an image, the method comprising:

generating a plurality of luminance values for a plurality of blocks which divides the display panel based on input image data;

generating a plurality of edge values in a first direction for the plurality of blocks based on the plurality of luminance values, wherein an edge value for a block among the plurality of blocks corresponds to a difference between a luminance value for the block during a frame period and a luminance value for a block adjacent to the block during the frame period;

determining a boundary area, extending in the first direction and having a boundary line extending in a second direction crossing the first direction, based on a continuity of edge blocks in the second direction, wherein the edge blocks are determined based on the plurality of edge values;

generating compensation data for decreasing a luminance of an image corresponding to the boundary area; and generating output image data based on the input image data and the compensation data.

2. The method of claim 1, wherein the plurality of edge values are generated by filtering the plurality of luminance values in the first direction using a high pass filter.

3. The method of claim 1, wherein determining the boundary area includes:

generating a plurality of count values for the plurality of blocks based on the plurality of edge values;

determining the edge blocks having a maximum count value among the plurality of blocks; and determining edge block columns as the boundary area, wherein the edge block columns are determined based on the continuity of the edge blocks in the second direction.

4. The method of claim 3, wherein a count value for a block among the plurality of blocks is increased when an edge value for the block is greater than a threshold value.

5. The method of claim 3, wherein a count value for the block among the plurality of blocks is maintained when the count value for the block is equal to the maximum count value.

6. The method of claim 3, wherein a count value for the block among the plurality of blocks is decreased when the edge value for the block is less than or equal to a threshold value.

7. The method of claim 3, wherein a count value for the block among the plurality of blocks is maintained when the count value for the block is equal to a minimum count value.

8. The method of claim 3, wherein determining the edge block columns as the boundary area includes:

calculating a number of the edge blocks included in each of a plurality of block columns extending in the second direction; and determining block columns in which the number of the edge blocks is greater than a threshold number as the edge block columns.

9. The method of claim 8, wherein the threshold number is one half of a number of the plurality of blocks included in each of the plurality of block columns.

10. The method of claim 3, wherein the plurality of luminance values are generated for each frame period, wherein the plurality of edge values are generated for the frame period, and wherein the plurality of count values are generated for the frame period.

11. The method of claim 3, wherein the edge blocks and the edge block columns are determined for a plurality of frame periods.

12. The method of claim 1, wherein the compensation data includes first compensation data, and wherein generating the compensation data includes, generating the first compensation data for gradually decreasing the luminance values for pixels included in the boundary area and a peripheral area disposed adjacent to the boundary area in the first direction toward the boundary line.

13. The method of claim 12, wherein the compensation data further includes second compensation data, and wherein generating the compensation data further includes generating the second compensation data for uniformly decreasing the luminance values for the pixels included in the display panel.

14. A display device, comprising: a driving controller which generates output image data based on input image data; a data driver which generates data voltages based on the output image data; and a display panel which displays an image based on the data voltages, wherein, when the display panel displays a first image and a second image with a boundary line located between the first image and the second image and extending in a second direction crossing a first direction and wherein grayscale values of the input image data corresponding to the first image are equal, a measured luminance of a first portion of the first image located adjacent to the boundary line is lower than a measured luminance of a second portion of the first image located farther away than the first portion in the first direction from the boundary line, wherein the driving controller generates a plurality of edge values in the first direction for a plurality of blocks dividing the display panel based on a plurality of luminance values for the plurality of blocks, wherein an edge value for a block among the plurality of blocks corresponds to a difference between a luminance value for the block during a frame period and a luminance value for a block adjacent to the block during the frame period.

15. The display device of claim 14, wherein the first direction is directed parallel to a long side of the display panel, and wherein the second direction is directed parallel to a short side of the display panel.

16. The display device of claim 14, wherein the driving controller determines a boundary area, extending in the first direction and having the boundary line, based on a continuity of edge blocks in the second direction, wherein the edge blocks are determined based on the plurality of edge values among the plurality of blocks, and generates the output image data based on the input image data and compensation data for decreasing a luminance of the image corresponding to the boundary area.

17. The display device of claim 16, wherein each of the plurality of blocks includes a plurality of pixels, and wherein a luminance value for a block among the plurality of blocks is an average of a plurality of luminance values corresponding to a plurality of grayscale values of the input image data for a plurality of pixels included in the block.

18. The display device of claim 16, wherein the driving controller includes:

a luminance generator which generates the plurality of luminance values based on the input image data;

an edge generator which generates the plurality of edge values based on the plurality of luminance values;

a determiner which determines the boundary area based on the plurality of edge values;

a compensation data generator which generates the compensation data based on the boundary area; and a data compensator which generates the output image data based on the input image data and the compensation data.

19. An electronic apparatus, comprising:

a main processor which generates an image signal;

a coprocessor which generates output image data by converting input image data corresponding to the image signal; and a display panel which displays an image based on the output image data, wherein the coprocessor, generates a plurality of edge values in a first direction for a plurality of blocks based on a plurality of luminance values for the plurality of blocks, wherein the plurality of blocks divide the display panel, wherein an edge value for a block among the plurality of blocks corresponds a difference between a luminance value for the block during a frame period and a luminance value for a block adjacent to the block during the frame period, determines a boundary area, extending in the first direction and having a boundary line extending in a second direction crossing the first direction, based on a continuity of edge blocks in the second direction, wherein the edge blocks are determined based on the plurality of edge values among the plurality of blocks, and generates the output image data based on the input image data and compensation data for decreasing a luminance of the image corresponding to the boundary area.

20. The electronic apparatus of claim 19, wherein the coprocessor includes:

a luminance generator which generates the plurality of luminance values based on the input image data;

an edge generator which generates the plurality of edge values based on the plurality of luminance values;

a determiner which determines the boundary area based on the plurality of edge values;

a compensation data generator which generates the compensation data based on the boundary area; and a data compensator which generates the output image data based on the input image data and the compensation data.

* * * * *